United States Patent [19]
Naito et al.

[11] Patent Number: 5,239,434
[45] Date of Patent: Aug. 24, 1993

[54] MAGNETIC HEAD, BONDING GLASS USED THEREFOR AND MAGNETIC RECORDING AND REPRODUCING APPARATUS

[75] Inventors: Takashi Naito, Hitachiota; Takashi Namekawa; Kunihiro Maeda, both of Hitachi; Yasutaka Suzuki, Ibaraki; Kouji Arikawa; Tsukasa Ohata, both of Katsuta, all of Japan

[73] Assignee: Hitachi, Ltd., Tokyo, Japan

[21] Appl. No.: 765,950

[22] Filed: Sep. 26, 1991

[30] Foreign Application Priority Data

Sep. 26, 1990 [JP] Japan .................. 2-254163

[51] Int. Cl.$^5$ .............. G11B 5/187; C03C 3/21
[52] U.S. Cl. ..................... 360/125; 360/120
[58] Field of Search ........... 360/120, 125; 501/41, 501/46; 502/353, 209

[56] References Cited

U.S. PATENT DOCUMENTS 4,794,483 12/1988 Naitoh et al. .................. 360/120

FOREIGN PATENT DOCUMENTS

| | | | |
|---|---|---|---|
| 62-30619 | 2/1987 | Japan | 502/353 |
| 62-78128 | 4/1987 | Japan | |
| 62-88109 | 4/1987 | Japan | |
| 2-225336 | 9/1990 | Japan | |
| 1481446 | 7/1977 | United Kingdom | 502/209 |

OTHER PUBLICATIONS

Rawson, Inorganic Glass-Forming Systems; Chapter 11, "Tellurite and Vanadate Glasses." Academic Press (1967) pp. 185-197.

*Primary Examiner*—Constantine Hannaher
*Attorney, Agent, or Firm*—Antonelli, Terry, Stout & Kraus

[57] ABSTRACT

A magnetic head of a structure in which a pair of magnetic cores, each comprising a magnetic film formed on a support, are butted and bonded to each other with glass and with the interposition of a non-magnetic gap material. The bonding glass is an oxide type glass containing vanadium as main constituent, and 55% or more of vanadium contained in the glass is tetravalent vanadium. This magnetic head is excellent in mass productivity, wear resistance, scratch resistance, weather resistance and magnetic properties.

12 Claims, 14 Drawing Sheets

MAGNETIC HEAD, BONDING GLASS USED THEREFOR AND MAGNETIC RECORDING AND REPRODUCING APPARATUS

BACKGROUND OF THE INVENTION

This invention relates to a magnetic head for use in a magnetic recording and reproducing apparatus, more specifically a magnetic head having excellent mass productivity, wear resistance, mar resistance, weather resistance and magnetic properties, bonding glass used therefor and a magnetic recording and reproducing apparatus adapted with said magnetic head.

In the conventional magnetic heads, there have been used single body of ferrite as magnetic core, principally $SiO_2$ as non-magnetic gap material and $SiO_2$-$B_2O_3$ based or $SiO_2$-$PbO$ based glass having a bonding temperature in the range of 700°-800° C. for bonding of the magnetic cores.

Recently, for achieving higher recording performance (recording at higher density) of the magnetic recording and reproducing apparatus such as VTR, the further improvements of recording art such as higher coercive force of the information recording medium, wider bands of recording and reproducing frequencies, and higher speed of recording tape or disc have come to be required, and it has become difficult for the conventional magnetic heads to meet these requirements. Under these circumstances, attention is directed to magnetic films of such materials as Co-based amorphous alloys, Sendust based alloys and Fe-C based materials which have higher saturation magnetic flux density than ferrite, for use as magnetic core, and some of such magnetic films have been commercialized. The saturation magnetic flux density of these magnetic films is over 8,000 G, which is far higher than that (4,000-5,000 G) of ferrite, so that use of a magnetic head incorporated with such a magnetic film serving as magnetic core may enable recording at far higher density than possible with the conventional magnetic heads. Said magnetic films, however, are inferior to ferrite in temperature resistance, so that glass having a bonding temperature of 700°-800° C. employed for the conventional magnetic heads is unappliable to the magnetic heads using said magnetic film. So, there is employed PbO-$B_2O_3$ based glass which is capable of low-temperature glass bonding. As the non-magnetic gap material, $SiO_2$ is used as heretofore in anticipation of a certain degree of reaction with this type of glass.

PbO-$B_2O_3$ based glass, however, had the problem that the production yield of magnetic heads was low due to notably low chemical stability (low water and moisture resistance, etc.) and poor mechanical properties such as hardness and strength in comparison with the glass used for the conventional magnetic heads. Said glass also involved the problem that when a magnetic tape is let run around the magnetic head, the glass bonded part thereof was apt to wear and also susceptible to scratch. These problems become more conspicuous when a magnetic recording tape or such formed by using deposition or sputtering techniques is let run or when it is let run in a high-humidity state. Said PbO-$B_2O_3$ based glass had the further problem of corrosive action on the magnetic film at the time of glass bonding, making it hard to obtain a magnetic head having the desired magnetic properties. For solving these problems, there were proposed a glass composition and a magnetic head disclosed in Japanese Patent Application Kokai (Laid-Open) Nos. 62-78128 and 62-88109. These patent applications disclose $V_2O_5$-$P_2O_5$-$Sb_2O_3$ based glass having better chemical stability and mechanical properties than the conventional PbO-$B_2O_3$ based glass and a high-performance magnetic head improved in reliability by using said new glass. This bonding glass for magnetic head is defined in its composition as follows in consideration of appropriate coefficient of thermal expansion and bonding temperature, improvement of water resistance, prevention of crystallization and other matters: preferably $V_2O_5 = 55$–$70$ wt %, $P_2O_5 = 17$–$25$ wt %, $Sb_2O_3 = 3$–$20$ wt %, $PbO = 0$–$20$ wt %, $Tl_2O = 0$–$15$ wt % and $Nb_2O_5 = 0$–$5$ wt %, more preferably $V_2O_5 = 55$–$65$ wt %, $P_2O_5 = 18$–$22$ wt %, $Sb_2O_3 = 5$–$12$ wt %, $PbO = 3$–$10$ wt %, $Tl_2O = 3$–$10$ wt % and $Nb_2O_5 = 0.5$–$2$ wt %.

In the prior art described above, no consideration has been given to the cells formed at the time of glass bonding of the magnetic head and reactivity between bonding glass and non-magnetic gap material. Therefore, in the case of said conventional $V_2O_5$-$P_2O_5$-$Sb_2O_3$ based glass within the defined range of preferred composition, a large number of cells would be generated at the time of glass bonding, and if such cells were present in the sliding face of the magnetic head, they would be filled up with fine powder of the recording medium when the recording medium such as recording tape is let run, thus deteriorating the magnetic head performance. Also, said $V_2O_5$-$P_2O_5$-$Sb_2O_3$ based glass are poor in reactivity with $SiO_2$ used as non-magnetic gap material. Therefore, in the case of magnetic head of the type in which bonding glass and non-magnetic gap material are reacted to bond together a pair of magnetic cores, firm and solid glass bond can hardly be expected as far as $SiO_2$ is used as non-magnetic gap material.

SUMMARY OF THE INVENTION

An object of the present invention is to provide a magnetic head having excellent mass productivity, wear resistance, mar resistance, weather resistance and magnetic properties, and bonding glass used for such magnetic head.

It is also envisaged in this invention to provide a magnetic recording and reproducing apparatus with high reliability and high performance by using said magnetic head.

For attaining said object, there is provided according to this invention a magnetic head of the structure in which a pair of magnetic cores, each comprising a magnetic film of high saturation magnetic flux density formed on a support, are placed butting against each other with interposition of a non-magnetic gap material and bonded together with glass, said bonding glass being oxide type glass containing element vanadium as main constituent, wherein 55% or more of element vanadium contained is tetravalent vanadium.

Figure 1:
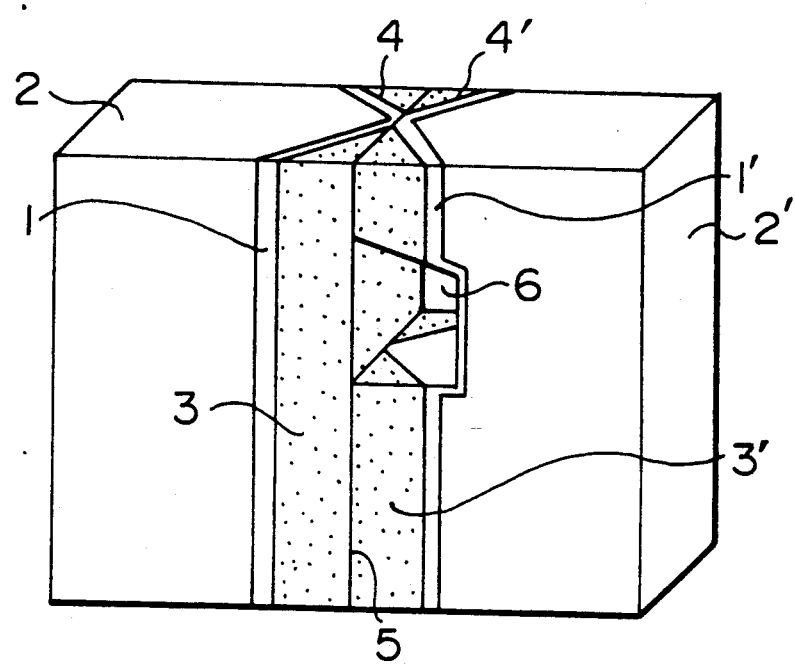
FIGS. 1 to 3 are perspective views of the magnetic heads constituted according to the present invention.

1, 1': magnetic film, 2, 2': support, 3, 3': 15 bonding glass, 4, 4': reaction preventive film, 5: gap-forming butted portion, 6: opening for coil winding, 7, 8, 9, 7', 8', 9': non-magnetic film, 10: groove defining opening for coil winding, 11, 11': track-forming grooves, 12, 13: magnetic core block, 14: non-magnetic gap material, 21: video head, 22: color signal processor, 23: luminance signal processor, 24: cassette, 25: recording tape, 26: motor, 27: motor drive.

DETAILED DESCRIPTION OF THE INVENTION

The bonding glass used in the present invention is preferably of a composition containing at least phosphorus and antimony in addition to vanadium and oxygen which are the main constituent elements. It is also preferred that said bonding glass further contains at least one of lead, tellurium, barium, thallium and arsenic as component elements.

In the magnetic head according to the present invention, a composite oxide or oxide mixture containing at least vanadium is preferably used as non-magnetic gap material. Preferably said non-magnetic gap material further contains at least element phosphorus. It is also desirable that said non-magnetic gap material additionally contains at least one of the following elements: antimony, lead, tellurium, barium, thallium and arsenic.

In said magnetic head, it is desirable that the magnetic film has a saturation magnetic flux density over 8,000 G so that the magnetic head can adapt itself to use with recording media of high coercive force above 1,000 Oe. Typical examples of the materials recommended to be used for said magnetic film are Co-based amorphous alloys, Sendust based alloys and Fe-C based materials. Such a magnetic film preferably has a multi-layer structure in which the layers are built up with a non-magnetic material interposed between every adjoining layers.

Also, in said magnetic head, it is desirable that the support has a micro-Vickers hardness Hv greater than 600 for suppressing wear caused by the recording medium or its protective material. The support is also preferably made of a non-magnetic ceramic material for restraining noise in the high frequency region.

The bonding glass for magnetic head according to this invention is oxide type glass comprising element vanadium as main constituent, and in the element vanadium contained in said glass, tetravalent vanadium accounts for 55% or more of the total amount of said element vanadium. The representative compositions of this bonding glass contain, in addition to element vanadium and element oxide, at least element phosphorus and element antimony, the contents of these component elements (calculated as $V_2O_5$, $P_2O_5$ and $Sb_2O_3$) being as follows: $P_2O_5$ = 35-75 parts by weight and $Sb_2O_3$ = 40-80 parts by weight to 100 parts by weight of $V_2O_5$. Preferably said glass further contains at least one of lead, tellurium and barium as component elements, the contents of these elements, calculated as PbO, $TeO_2$ and BaO, being less than 55 parts by weight, preferably 8-38 parts by weight in total to 100 parts by weight of $V_2O_5$. Absence of these elements induces no notable problem. It is also desirable that said glass additionally contains at least one of thallium and arsenic as component elements, the content of these elements, calculated as $Tl_2O$ and $As_2O_3$, combined being less than 30 parts by weight, preferably 3-16 parts by weight. No problem is raised by the absence of these elements. The bonding glass for magnetic head according to this invention is not limited in its use to the magnetic heads; it is also use for low-temperature glass bonding of electronic parts, etc. It is also envisaged in this invention to provide a magnetic recording and reproducing apparatus comprising a magnetic head of a structure in which a pair of magnetic cores, each comprising a magnetic film of high saturation magnetic flux density formed on a support, said cores being arranged in opposed relation with the interposition of a non-magnetic gap material, are bonded together with oxide type glass containing vanadium as main component element in which tetravalent vanadium accounts for 55% or more of the whole amount of vanadium; a magnetic head drive; and a control unit designed to perform processing of information from the recording medium in association with the magnetic head. This magnetic recording and reproducing apparatus, in which the magnetic head of this invention is used, can well accord with the recording media with high coercive force above 1,000 Oe, and further, in use of the apparatus, said magnetic head contacts the recording medium or its protective covering at a relative velocity higher than 5.8 m/sec without causing any notable wear of the magnetic head, assuring safe use of the apparatus. Therefore, the magnetic recording and reproducing apparatus such as VTR in which the magnetic head of this invention is applied can be significantly improved in performance and reliability. Also, the magnetic head of this invention can be applied as effectively to the magnetic recording and reproducing apparatus using a magnetic disc.

Generally, it is considered that oxide type glass comprising element vanadium as main constituent has a layered structure which admits easy entrance of water molecules, etc., and such a layered structure is essentially formed by pentavalent vanadium. The oxide type glass comprising element vanadium as main constituent and having said structure produces a large number of cells at the time of glass bonding. The investigations into the cause of generation of the cells led to a theory that the cells are generated as a result of gasification, at the time of glass bonding, of the water molecules, etc., entrapped between the layers of said layered structure. So, for reducing the cells generated, the influence of glass composition and additives on the glass structure was examined. As a result, it was found that the higher the rate of formation of tetravalent vanadium by reduction of pentavalent vanadium, the less becomes the number of cells generated. The result of analysis of the glass structure suggested that the higher the rate of formation of tetravalent vanadium, the more promoted is conversion of the glass structure into a three-dimensional network structure into which the water molecules, etc., are hard to enter.

Said bonding glass has excellent chemical stability and mechanical properties and also exerts little corrosive action on the magnetic film at the time of glass bonding, so that use of this bonding glass enables obtainment of a magnetic head having excellent mass productivity, wear resistance, scratch resistance, weather resistance and magnetic properties. However, when the rate of formation of tetravalent vanadium is less than 55%, cells are generated in the glass bonded section, and a greater number of such cells are generated as the rate of formation of tetravalent vanadium lowers. Thus, if the rate of formation of tetravalent vanadium is less than 55%, it is hard to produce the magnetic heads with high reliability in a high yield.

Element phosphorus, like element antimony, serves for reducing pentavalent vanadium into tetravalent vanadium. The contents of these elements, calculated as $V_2O_5$, $P_2O_5$ and $Sb_2O_3$, in said bonding glass are preferably selected such that $P_2O_5$ will be present an amount of 35–75 parts by weight and $Sb_2O_3$ in an amount of 40–80 parts by weight to 100 parts by weight of $V_2O_5$. If the content of $P_2O_5$ is less than 35 parts by weight or the content of $Sb_2O_3$ exceeds 80 parts by weight, the crystallization tendency in the glass bonded section is intensified, making it unable to obtain high bonding strength. Also, there remains the voids resembling the cells in the glass bonded section. Further, in case the content of $Sb_2O_3$ exceeds 80 parts by weight, the rate of formation of tetravalent vanadium becomes approximately 100%, resulting in a marked reduction of reducing action on pentavalent vanadium. On the other hand, if the content of $P_2O_5$ exceeds 75 parts by weight, water resistance is deteriorated and the bonding temperature becomes too high. Also, if the content of $Sb_2O_3$ is less than 40 parts by weight, the rate of formation of tetravalent vanadium becomes lower than 55% or water resistance is deteriorated.

It is desirable that said bonding glass further contains at least one of lead, tellurium, barium, thalium and arsenic as component elements. Of these elements, lead, tellurium and barium are helpful for improving vitrification stability, and lead, tellurium and thalium are conducive to control of coefficient of thermal expansion, whilst tellurium, thalium and arsenic are effective for lowering the bonding temperature. Arsenic and thalium, like antimony, have the action of reducing pentavalent vanadium into tetravalent vanadium. As for the content of these elements, in case one or both of tellurium and barium are contained, the content of said elements, calculated as PbO, $TeO_2$ and BaO, should preferably be less than 55 parts by weight in all to 100 parts by weight of $V_2O_5$. In case one or more of other elements are contained, the contents of the elements, calculated as $Tl_2O$ and $As_2O_3$, should preferably be less than 30 parts by weight in all.

If the total content of one or more of PbO, $TeO_2$ and BaO exceeds 55 parts by weight, the glass becomes frail or the bonding temperature becomes too high. The content of said element(s) in the glass is preferably 8–38 parts by weight, but no serious problem is encountered even if the content is not within this range, as far as it is 55 parts by weight or less. If the content of one or both of $Tl_2O$ and $As_2O_3$ exceeds 30 parts by weight, the crystallization tendency is too much encouraged, making it unable to obtain the desired bonding strength. The content is preferably 3–16 parts by weight, but no problem arises in practical use of the glass even if the content of said element(s) is not within this range, as far as it is 30 parts by weight or less.

The bonding glass of this invention finds particularly useful application to the magnetic heads with high reliability and high performance, but it is also useful for low-temperature bonding in the other fields. For instance, said glass can be utilized effectively as sintering auxiliary, coating agent and adhesive for ceramics and metals.

Further, in said magnetic head, by using a composite oxide or oxide mixture containing at least element vanadium for said non-magnetic gap material, it is possible to improve reactivity with the bonding glass and to enhance strength of the bonded section. Reactivity of the non-magnetic gap material can be further improved by additionally containing at least element phosphorus. Even greater improvement of reactivity can be achieved by further containing at least one of antimony, lead, tellurium, barium, thalium and arsenic. In the latter case, chemical stability of the non-magnetic gap material is also improved. The non-magnetic gap material containing said elements is essentially a composite oxide or oxide mixture comprising $SiO_2$, which has been used as non-magnetic gap material in the prior art, and the oxides of said elements. There is however no need of sticking to $SiO_2$; any other material which is capable of making reliable gap setting can be used. More specifically, a material having a melting point and hardness equal to or higher than those of $SiO_2$ can be used in place of $SiO_2$. Typical examples of such material are $Al_2O_3$ and $ZrO_2$.

In the magnetic head of this invention, a material having a coefficient of thermal expansion close to that of the magnetic film and a micro-Vickers hardness (Hv) greater than 600 is used for the support on which said magnetic film is formed, so that the wear of the magnetic head is minimized when a magnetic tape or disc is let run around it. This magnetic head can also adapt itself to speed-up in run of magnetic tape or disc. It is especially desirable that a non-magnetic ceramic material is used for the support. When the support is non-magnetic, no sliding noise is produced in the high-frequency region like ferrite and there can be obtained a magnetic head showing good recording and reproducing characteristics in the broad frequency band.

The magnetic head of this invention, as appreciated from the above statements, enables performance of desired recording even on a recording medium with high coercive force above 1,000 Oe formed by deposition or sputtering method. Also, in operation of the magnetic head in contact with a recording medium or its protective material, even if relative velocity thereof is increased, the magnetic head can stand long-time use and is capable of recording and reproduction in the high-frequency region, so that use of the magnetic head of this invention can realize a remarkable improvement of performance and reliability of the magnetic recording and reproducing devices such as VTR.

In the currently available VHS-VTR, the coated type iron oxide tapes are used and the relative velocity of the tape to the magnetic head is 5.8 m/sec. In Hi8-VTR, the metallized tapes with high coercive force are used and the relative velocity thereof is 3.8 m/sec. Metallized tape is advantageous for high-density recording as it has higher coercive force than iron oxide tape, but the former is apt to cause faster wear of the magnetic head. High relative velocity of the recording tape to the magnetic head is also advantageous for high-density recording, but it, too, invites faster wear of the magnetic head. Elevation of said relative velocity and increase of coercive force of the information recording media are essential for realizing high-density recording with the magnetic recording and reproducing apparatus such as VTR. Broadening of the recording and reproducing frequency band is also necessary. The magnetic head of this invention and the magnetic recording and reproducing apparatus in which said magnetic head is used can well answer to these requirements.

DESCRIPTION OF PREFERRED EMBODIMENTS

The present invention will be further described below concerning the embodiments thereof.

Figure 2:
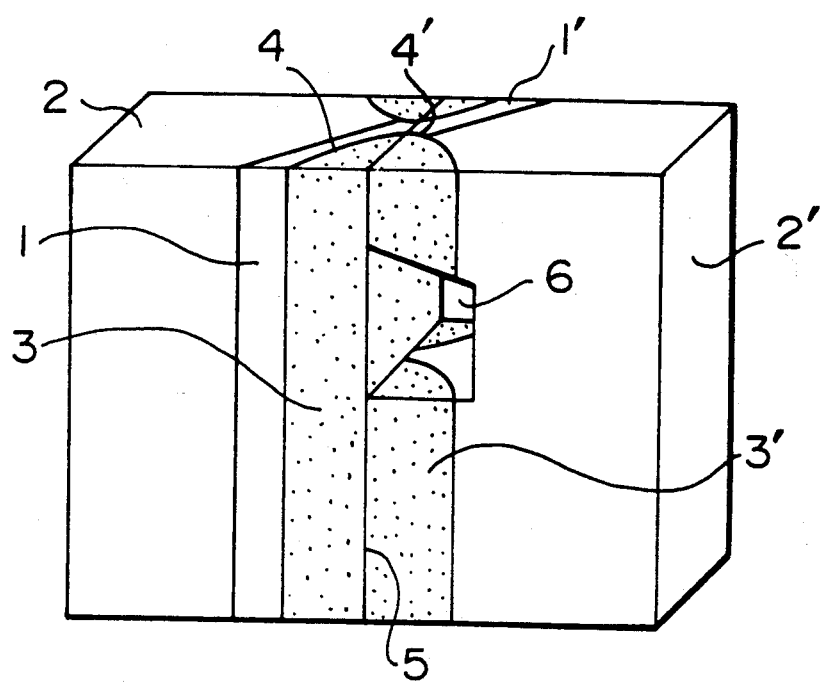
Figure 3:
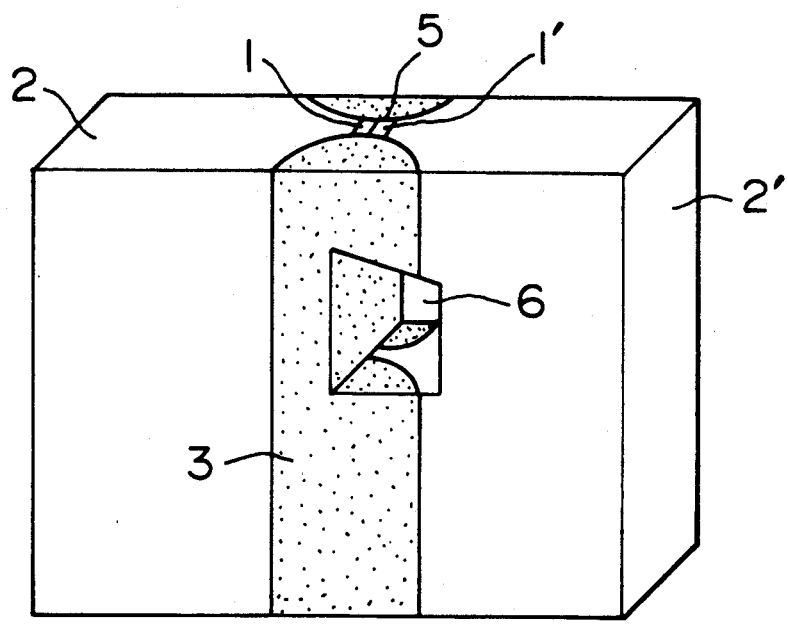

Referring to FIGS. 1 to 3 of the accompanying drawings, there are shown perspective views of typical examples of magnetic head according to the present invention. In the shown examples of magnetic head, the magnetic films 1, 1' with high saturation magnetic flux density are formed on the supports 2, 2' and bonded by bonding glass 3, 3' through a reaction preventive film 4, 4' provided for inhibiting corrosive action of bonding glass against the magnetic films. A working gap is formed at the butted portion 5 with the interposition of a non-magnetic gap material and an opening for coil winding.

Figure 4:
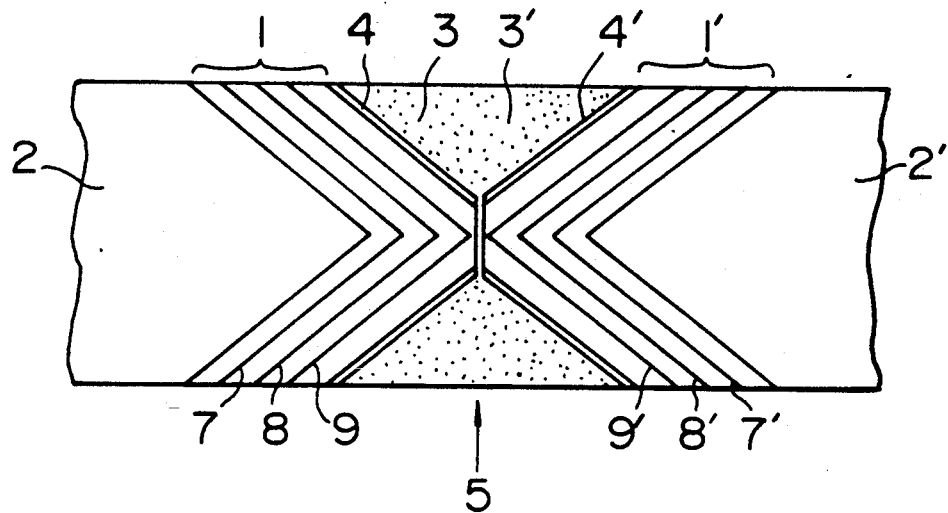
FIG. 4 is a schematic illustration of the sliding face of the magnetic head shown in FIG. 1.
Figure 5:
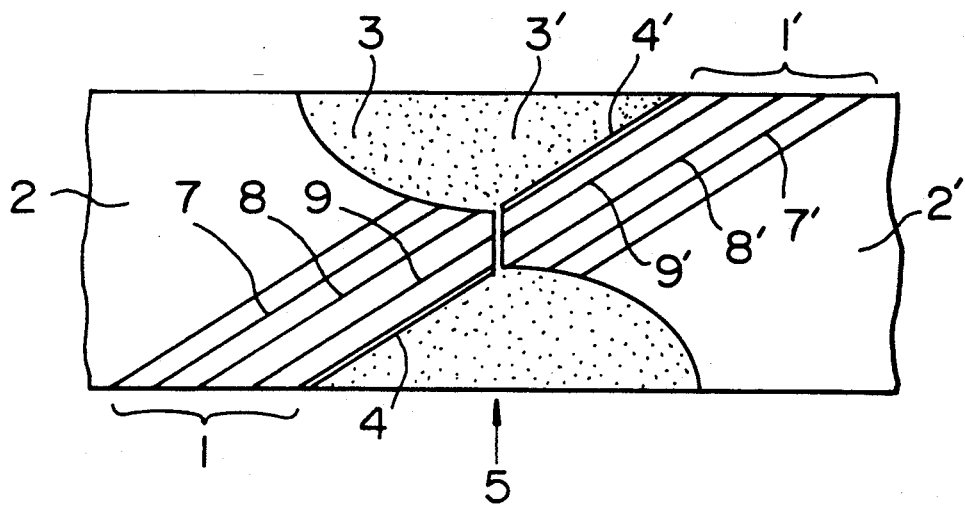
FIG. 5 is a schematic illustration of the sliding face of the magnetic head shown in FIG. 2.

The magnetic films 1, 1' in the magnetic heads shown in FIGS. 1 and 2 are preferably composed of plural layers separated by non-magnetic films 7, 8, 9, 7', 8', 9' as shown in FIGS. 4 and 5 for improving the magnetic head performance.

The processes for producing said three types of magnetic head are described below.

Figure 6:
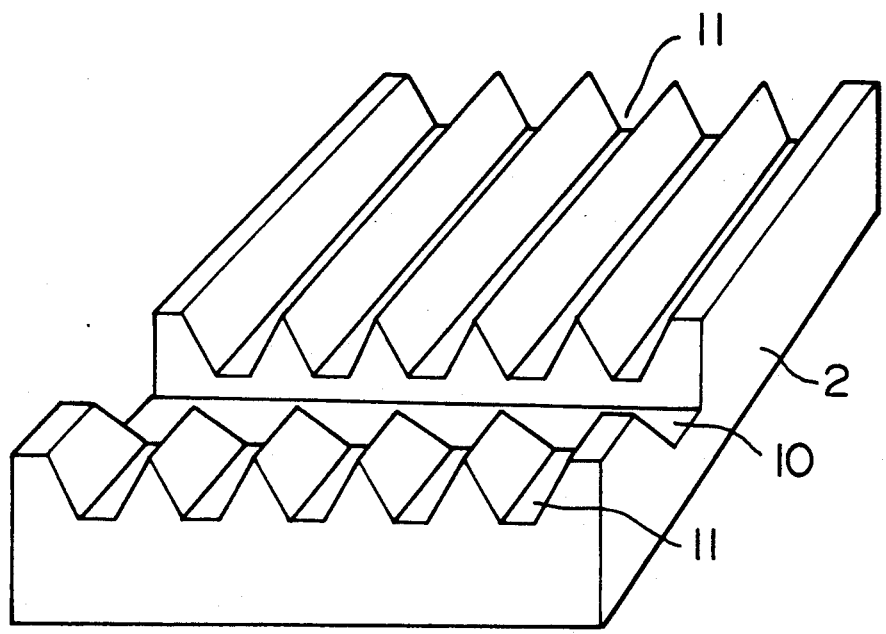
FIGS. 6 to 9 are schematic illustrations of the steps in the process for producing the magnetic head shown in FIG. 1.
Figure 7:
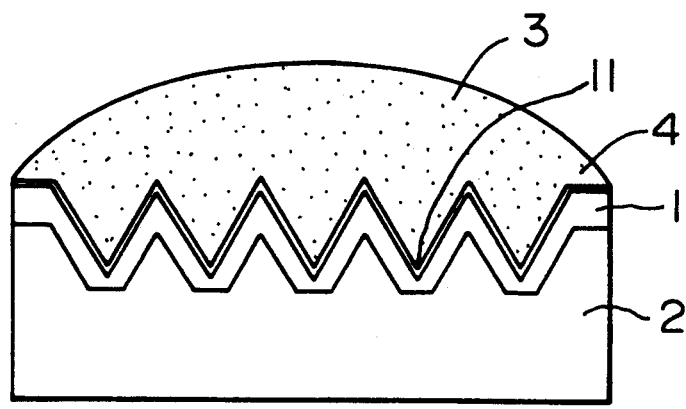
Figure 8:
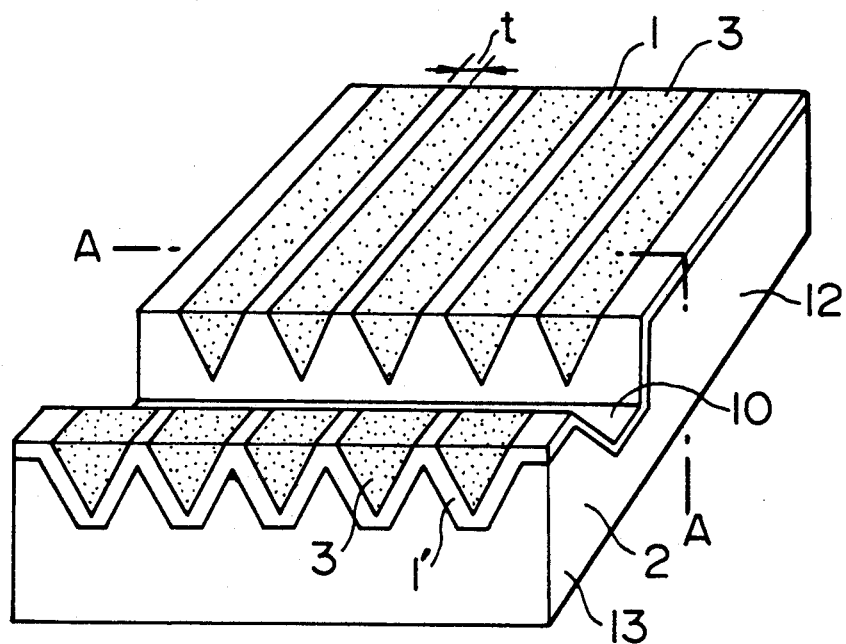
Figure 9:
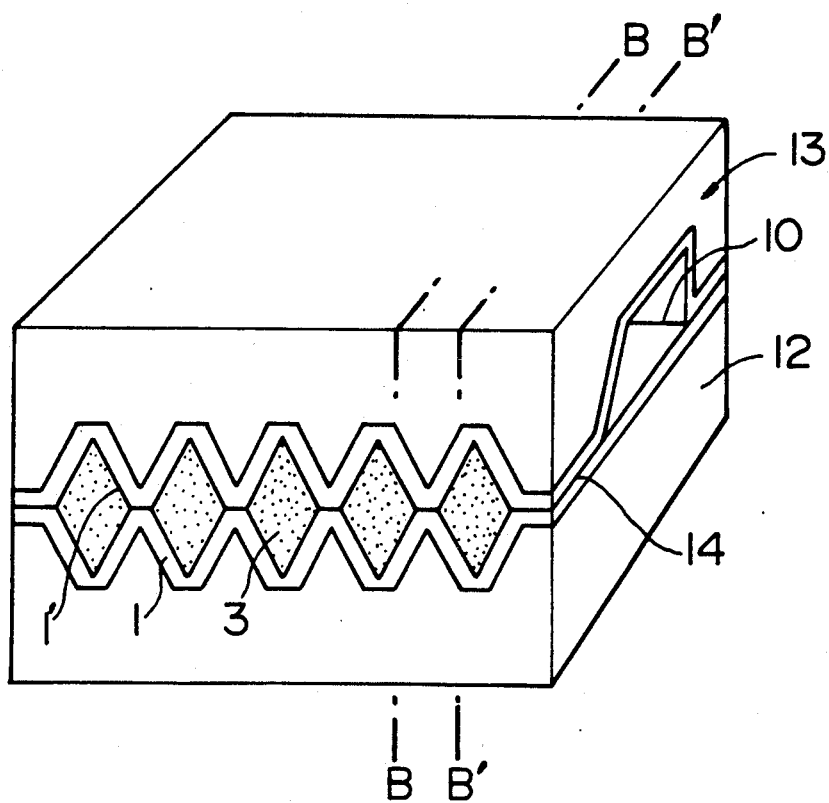

For producing the magnetic head shown in FIG. 1, first a groove 10 defining an opening for coil winding and a plurality of truck grooves 11 are provided in a support 2 to constitute the gap-forming butting face as shown in FIG. 6. After washing well the grooved support, a magnetic film 1 and a reaction preventive film 4 therefor are sputtered on the butting face, and then the truck grooves 11 are filled up with bonding glass 3 at a temperature below the limit heat withstanding temperature of the magnetic film, as shown in FIG. 7. The magnetic film is preferably not a single-layer film but a multi-layered film composed of plural layers laminated with a non-magnetic film interposed therebetween as shown in FIG. 4. Then, the unnecessary glass and magnetic film are ground away to form a groove 10 defining an opening for coil winding and a plurality of trucks with a width t on each butting face, and then the assembly is cut along the single-dotted chain line A to make a pair of magnetic core blocks 12, 13 as shown in FIG. 8. After washing well these magnetic core blocks, a predetermined amount of non-magnetic gap material 14 is sputtered on the butting faces, and said magnetic core blocks are butted and bonded to each other at a temperature below the limit heat withstanding temperature of the magnetic film as shown in FIG. 9. Then the assembly is cut along the single-dotted chain lines B, B' successively to obtain the magnetic head shown in FIG. 1.

Figure 10:
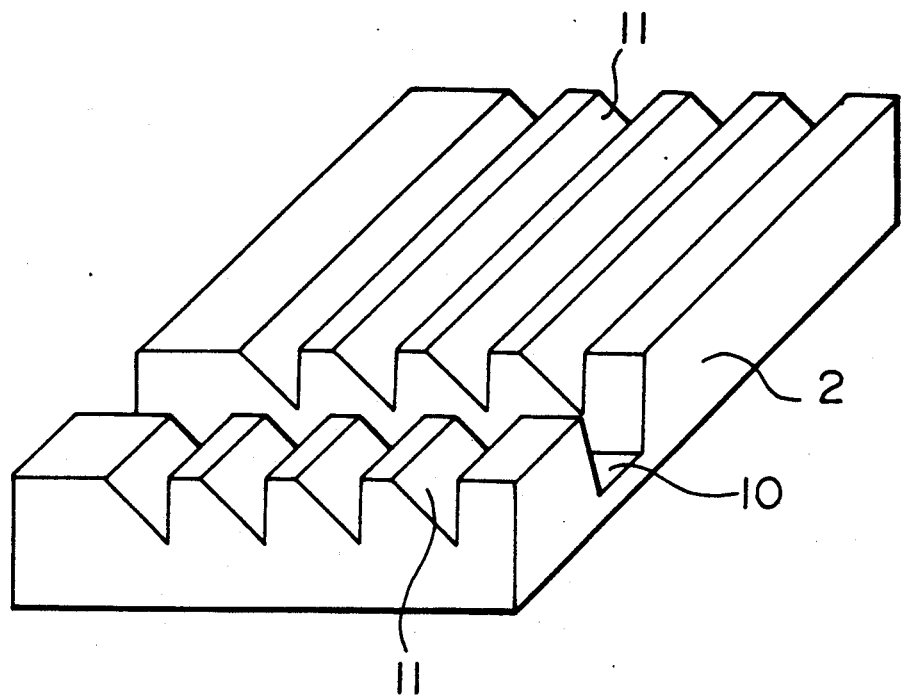
FIGS. 10 to 15 are schematic illustrations of the steps in the process for producing the magnetic head shown in FIG. 2.
Figure 11:
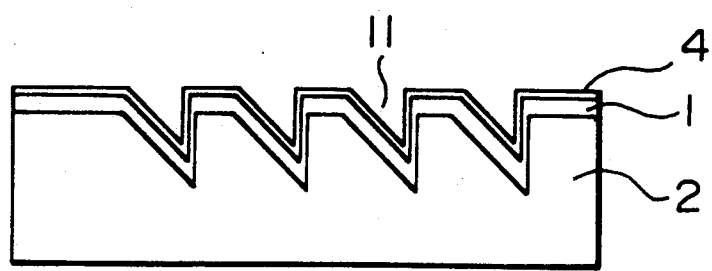
Figure 12:
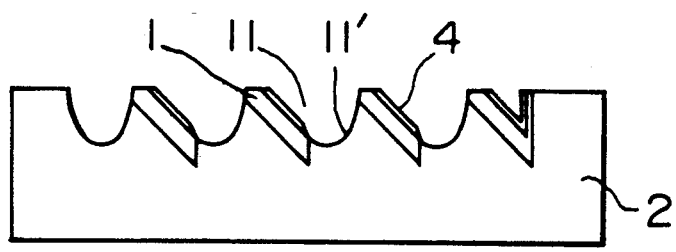
Figure 13:
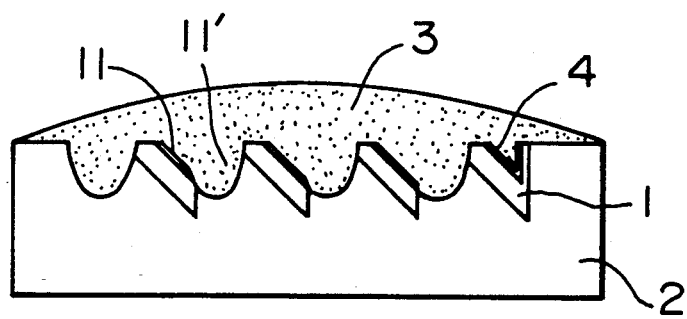
Figure 14:
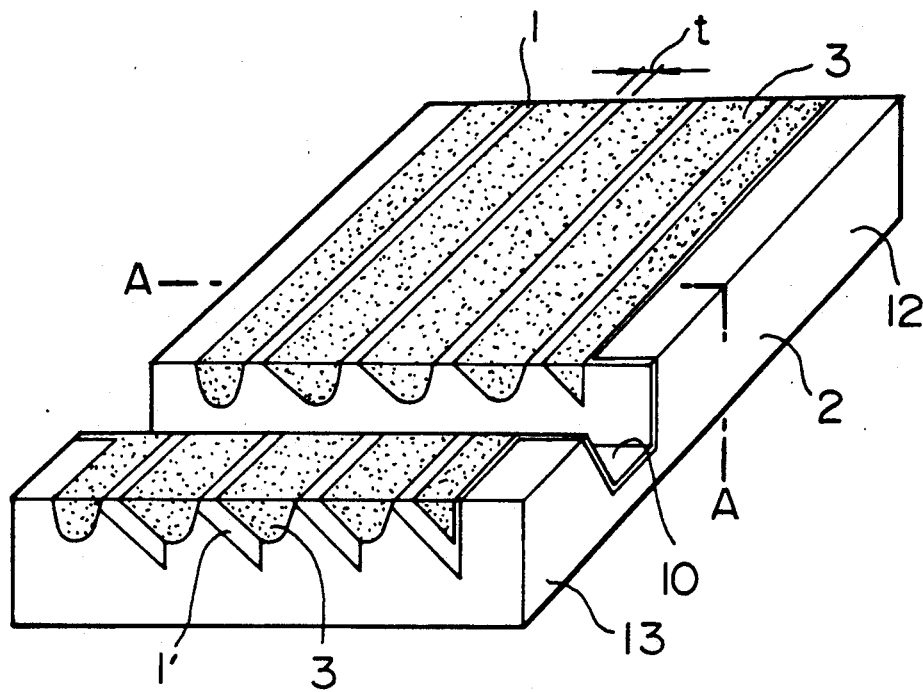
Figure 15:
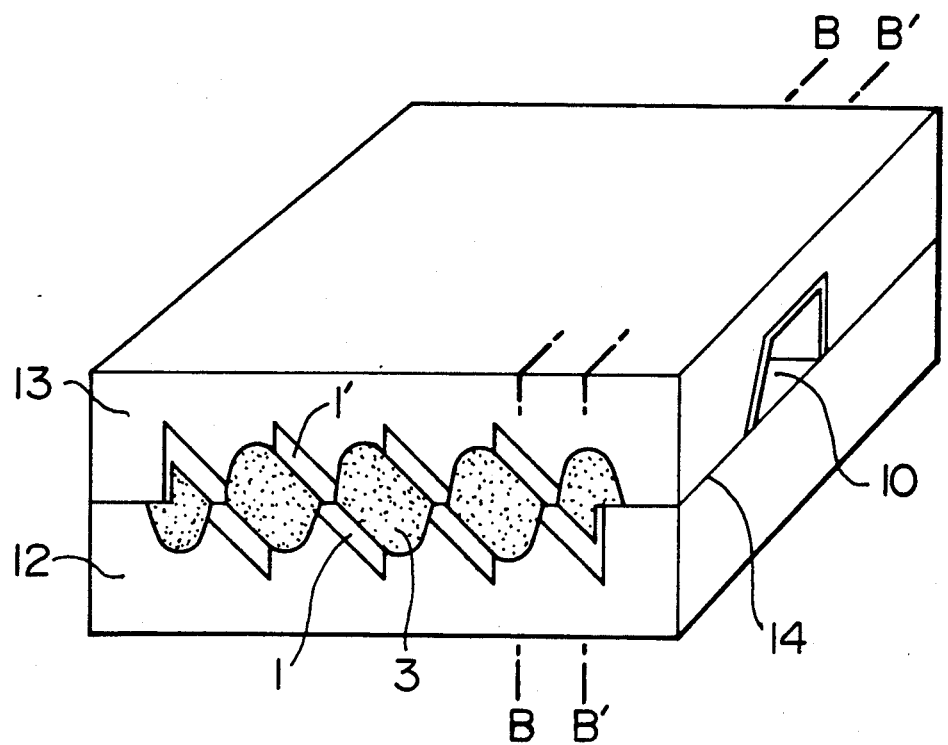

For producing the magnetic head shown in FIG. 2, first a groove defining an opening for coil winding and a plurality of truck grooves 11 are provided in a support 2 to form the butting face as shown in FIG. 10. After washing well the grooved support, a magnetic film 1 and a reaction preventive film 4 therefor are sputtered on the butting face as shown in FIG. 11. The magnetic film is preferably not a single-layer film but a multi-layered film as shown in FIG. 5. Then, the unnecessary magnetic film is ground away and the additional truck grooves 11' are provided as shown in FIG. 12. After washing well this work, the truck grooves 11 and 11' are filled up with bonding glass 3 at a temperature below the limit heat withstanding temperature of the magnetic film as shown in FIG. 13. A reaction preventive film may be sputtered before filling with glass. Then, as shown in FIG. 14, the unnecessary glass and magnetic film are ground away to form a groove 10 serving as an opening for coil winding and a plurality of trucks with a width of t on the butting face, and then the assembly is cut along the single-dotted chain line A to obtain a pair of magnetic core blocks 12, 13. After washing well these magnetic core blocks, a predetermined amount of non-magnetic gap material 14 is sputtered on the butting face of each block, and then the two magnetic core blocks are butted and bonded to each other at a temperature below the limit heat withstanding temperature of the magnetic film as shown in FIG. 15. Then the assembly is cut along the single-dotted chain lines B and B' successively to obtain the magnetic heat shown in FIG. 2. In this magnetic head, the magnetic film can be made smaller in thickness and also the truck width can be made smaller than in the magnetic head shown in FIG. 1, so that there can be obtained a magnetic head having better magnetic properties.

Figure 16:
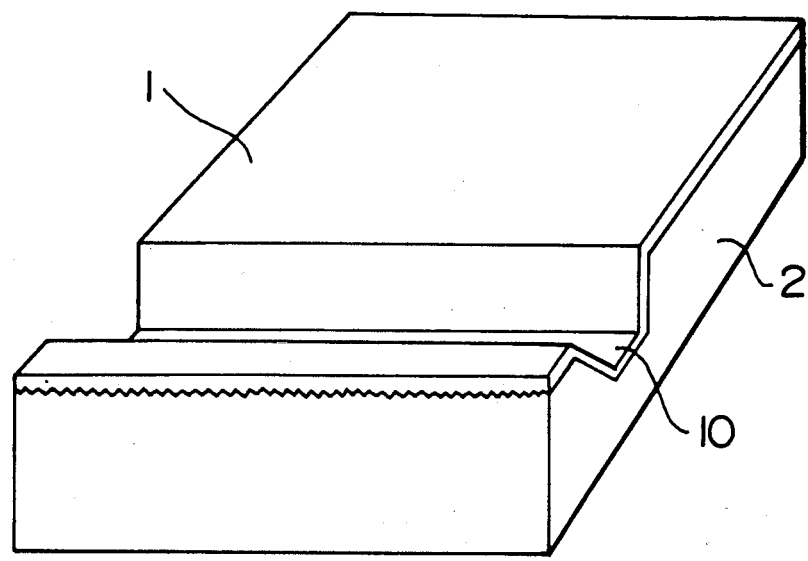
FIGS. 16 to 18 are schematic illustrations of the steps in the process for producing the magnetic head shown in FIG. 3.
Figure 17:
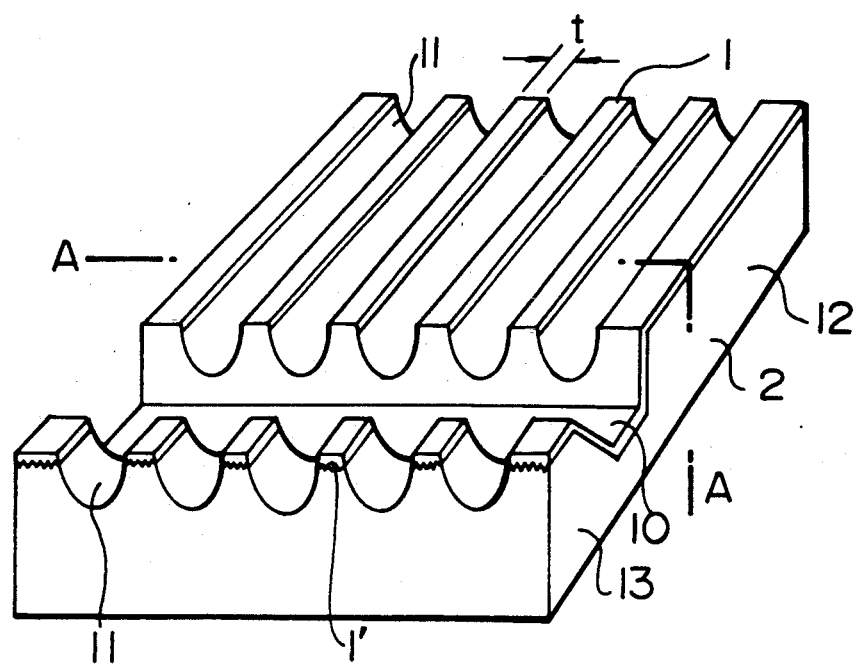
Figure 18:
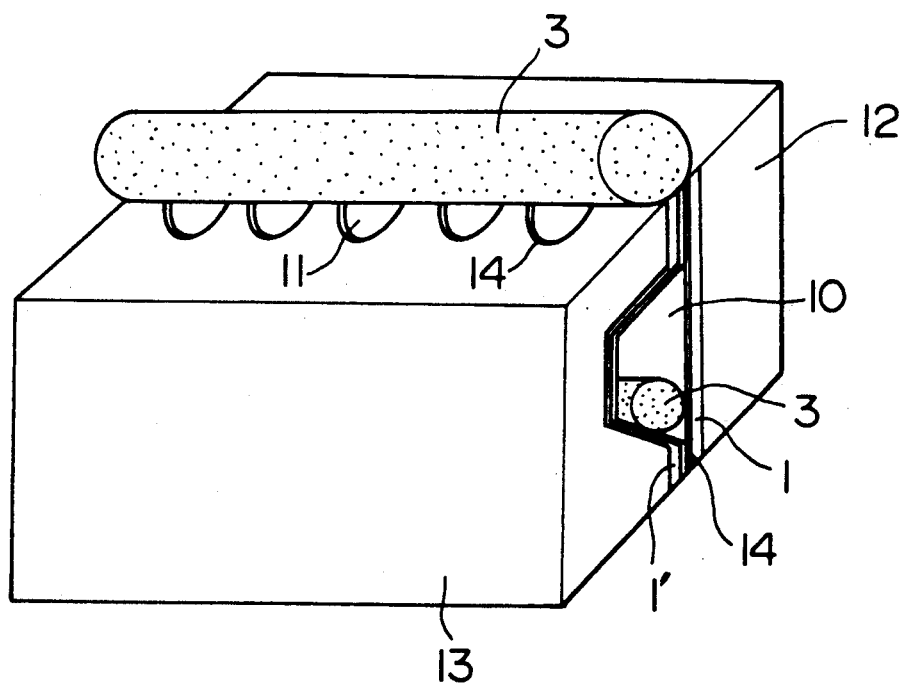

For producing the magnetic head shown in FIG. 3, first a magnetic film 1 is sputtered to a predetermined thickness on the gap-forming butting face in a support 2 provide with a groove 10 defining an opening for coil winding, as shown in FIG. 16. The butting face to be sputtered of the support needs to be roughened deliberately so that it won't function as a pseudo-gap. Then, as shown in FIG. 17, unevenness on the magnetic film 1 formed on the butting face is ground away, and the truck grooves 11 are provided so that a predetermined truck width t can be obtained. The resulting work is then cut along the single-dotted chain line A to make a pair of magnetic core blocks 12, 13. After washing well these magnetic core blocks, a non-magnetic gap material 14 is sputtered to a predetermined thickness on each butting face, and then said blocks are butted and bonded to each other by fusing and pouring the rod-shaped bonding glass 3 into the truck grooves 11 and 11' at a temperature below the limit heat withstanding temperature of the magnetic film as shown in FIG. 18. Then the assembly is cut in the same way as in the manufacture of the magnetic heads of FIGS. 1 and 2 to produce the magnetic head shown in FIG. 3. This magnetic head is inferior to those of FIGS. 1 and 2 in magnetic properties, but it has excellent mass productivity as its production process is simple.

TABLE 1

| Magnetic film | | Saturation magnetic flux density (G) | Coefficient of thermal expansion ($\times 10^{-7}/^{\circ}C.$) | Limit heat withstanding temp. (°C.) |
| --- | --- | --- | --- | --- |
| A | Co-based amorphous alloy (Co—Nb—Zr) | 9000 | 120 | 480 |
| B | Sendust alloy (Fe—Si—Al) | 10000 | 150 | 620 |
| C | Fe—C based | 15000 | 130 | 620 |

TABLE 1-continued

| Magnetic film | Saturation magnetic flux density (G) | Coefficient of thermal expansion ($\times 10^{-7}$/°C.) | Limit heat withstanding temp. (°C.) |
|---|---|---|---|
| material (Fe—C—Ta) | | | |
| D Single-crystal Mn—Zn ferrite | 5000 | 110 | 800 |

The properties of the magnetic films used in the Examples are shown in Table 1. There are also shown, for comparison's sake, the properties of the magnetic film made of single-crystal Mn-Zn ferrite with high saturation magnetic flux density which has been popularly used in the magnetic heads for VTR, etc. As seen from the above table, saturation magnetic flux density of Co-based amorphous alloy, Sendust alloy and Fe-C based material is far higher than that of ferrite. Therefore, the effect of use of said materials on betterment of performance of magnetic head is very great unless the bonding glass causes no corrosion of the magnetic film at the time of glass bonding of the magnetic head. It is to be noted that if the glass bonding temperature of the magnetic head is higher than the limit heat withstanding temperature of the magnetic film, its magnetic properties are deteriorated, so that glass bonding needs to be carried out at a temperature below the limit heat withstanding temperature of the magnetic film.

TABLE 2

| | Support | Coefficient of thermal expansion ($\times 10^{-7}$/°C.) | Micro-Vickers hardness Hv | Remarks |
|---|---|---|---|---|
| a | Single-crystal Mn—Zn ferrite | 110 | 650 | Magnetic material (material D in Table 1) |
| b | $\alpha$-$Fe_2O_3$ based ceramics | 115 | 900 | Non-magnetic material |
| c | NiO—CoO—$TiO_2$ based ceramics | 120 | 650 | Non-magnetic material |
| d | MgO—NiO based ceramics | 130 | 800 | Non-magnetic material |
| e | MnO—NiO based ceramics | 135 | 600 | Non-magnetic material |
| f | $TiO_2$—NiO—CaO based ceramics | 140 | 850 | Non-magnetic material |

The properties of the supports used in the Examples are shown in Table 2. The support used for the magnetic head of this invention needs to have a micro-Vickers hardness Hv of at least 600 in view of wear resistance of the magnetic head. Further, as it was necessary to match the support with the magnetic film in coefficient of thermal expansion to some extent, there were used, in the Examples, the supports a-c of Table 2 for the magnetic film A shown in Table 1, the supports e and f for the magnetic film B and the supports c and d for the magnetic film C.

TABLE 3

| No. | $V_2O_5$ | $P_2O_5$ | $Sb_2O_3$ | PbO | $TeO_2$ | BaO | $Tl_2O$ | $As_2O_3$ | $V^{4+}/V_{total}$ (%) | Bonding temp. (°C.) | Number of cells formed (per mm$^2$) | Coefficient of thermal expansion ($\times 10^{-7}$/°C.) | Micro-Vickers hardness Hv | Water resistance |
|---|---|---|---|---|---|---|---|---|---|---|---|---|---|---|
| 1 | 100 | 26 | — | — | — | — | — | — | 18 | 400 (crystallized) | — | 83 | 275 | x |
| | 79.4 | 20.6 | — | — | — | — | — | — | | | | | | |
| 2 | 100 | 35 | — | — | — | — | — | — | 22 | 410 | 38 | 80 | 285 | x |
| | 74.1 | 25.9 | — | — | — | — | — | — | | | | | | |
| 3 | 100 | 42 | — | — | — | — | — | — | 28 | 460 | 29 | 75 | 315 | x |
| | 70.4 | 29.6 | — | — | — | — | — | — | | | | | | |
| 4 | 100 | 52 | — | — | — | — | — | — | 34 | 500 | 25 | 78 | 345 | x |
| | 65.8 | 34.2 | — | — | — | — | — | — | | | | | | |
| 5 | 100 | 75 | — | — | — | — | — | — | 45 | 600 | 16 | 77 | 405 | x |
| | 57.1 | 42.9 | — | — | — | — | — | — | | | | | | |
| 6 | 100 | 80 | — | — | — | — | — | — | 50 | 640 | 7 | 72 | 420 | x |
| | 55.6 | 44.4 | — | — | — | — | — | — | | | | | | |
| 7 | 100 | 30 | 70 | — | — | — | — | — | 85 | 460 (crystallized) | — | 81 | 325 | ○ |
| | 50.0 | 15.0 | 35.0 | — | — | — | — | — | | | | | | |
| 8 | 100 | 35 | 7 | — | — | — | — | — | 30 | 420 | 22 | 76 | 300 | x |
| | 70.4 | 24.6 | 4.9 | — | — | — | — | — | | | | | | |
| 9 | 100 | 35 | 14 | — | — | — | — | — | 39 | 430 | 13 | 77 | 305 | x |
| | 67.1 | 23.5 | 9.4 | — | — | — | — | — | | | | | | |
| 10 | 100 | 35 | 23 | — | — | — | — | — | 48 | 450 | 5 | 78 | 320 | x |
| | 63.3 | 22.2 | 14.6 | — | — | — | — | — | | | | | | |
| 11 | 100 | 35 | 30 | — | — | — | — | — | 55 | 450 | 0 | 80 | 320 | △ |
| | 60.6 | 21.2 | 18.2 | — | — | — | — | — | | | | | | |
| 12 | 100 | 35 | 34 | — | — | — | — | — | 61 | 450 | 0 | 81 | 325 | △ |
| | 59.2 | 20.7 | 20.1 | — | — | — | — | — | | | | | | |
| 13 | 100 | 35 | 40 | — | — | — | — | — | 67 | 450 | 0 | 83 | 330 | ○ |
| | 57.1 | 20.0 | 22.9 | — | — | — | — | — | | | | | | |
| 14 | 100 | 35 | 47 | — | — | — | — | — | 73 | 460 | 0 | 82 | 335 | ○ |
| | 54.9 | 19.2 | 25.8 | — | — | — | — | — | | | | | | |
| 15 | 100 | 35 | 57 | — | — | — | — | — | 85 | 470 | 0 | 79 | 340 | ○ |
| | 52.1 | 18.2 | 29.7 | — | — | — | — | — | | | | | | |
| 16 | 100 | 35 | 70 | — | — | — | — | — | 95 | 480 | 0 | 80 | 340 | ○ |
| | 48.8 | 17.1 | 34.1 | — | — | — | — | — | | | | | | |
| 17 | 100 | 35 | 80 | — | — | — | — | — | 95 | 480 | 0 | 79 | 340 | ○ |
| | 46.5 | 16.3 | 37.2 | — | — | — | — | — | | | | | | |
| 18 | 100 | 35 | 90 | — | — | — | — | — | 97 | 490 (crystallized) | — | 77 | 345 | ○ |
| | 44.4 | 15.6 | 40.0 | — | — | — | — | — | | | | | | |
| 19 | 100 | 42 | 7 | — | — | — | — | — | 36 | 480 | 22 | 72 | 325 | x |
| | 67.1 | 28.2 | 4.7 | — | — | — | — | — | | | | | | |
| 20 | 100 | 42 | 14 | — | — | — | — | — | 41 | 480 | 13 | 81 | 335 | x |
| | 64.1 | 26.9 | 9.0 | — | — | — | — | — | | | | | | |

TABLE 3-continued

| No. | V$_2$O$_5$ | P$_2$O$_5$ | Sb$_2$O$_3$ | PbO | TeO$_2$ | BaO | Tl$_2$O | As$_2$O$_3$ | V$^{4+}$/V$_{total}$ (%) | Bonding temp. (°C.) | Number of cells formed (per mm$^2$) | Coefficient of thermal expansion (×10$^{-7}$/°C.) | Micro-Vickers hardness Hv | Water resistance |
|---|---|---|---|---|---|---|---|---|---|---|---|---|---|---|
| 21 | 100 | 42 | 24 | — | — | — | — | — | 49 | 480 | 7 | 78 | 345 | x |
|  | 60.2 | 25.3 | 14.5 | — | — | — | — | — | | | | | | |
| 22 | 100 | 42 | 35 | — | — | — | — | — | 55 | 480 | 0 | 80 | 350 | Δ |
|  | 56.5 | 23.7 | 19.8 | — | — | — | — | — | | | | | | |
| 23 | 100 | 42 | 40 | — | — | — | — | — | 61 | 490 | 0 | 80 | 350 | ○ |
|  | 54.9 | 23.1 | 22.0 | — | — | — | — | — | | | | | | |
| 24 | 100 | 42 | 50 | — | — | — | — | — | 70 | 490 | 0 | 82 | 355 | ○ |
|  | 52.1 | 21.9 | 26.0 | — | — | — | — | — | | | | | | |
| 25 | 100 | 42 | 70 | — | — | — | — | — | 94 | 510 | 0 | 84 | 370 | ○ |
|  | 47.2 | 19.8 | 33.0 | — | — | — | — | — | | | | | | |
| 26 | 100 | 42 | 80 | — | — | — | — | — | 96 | 520 | 0 | 82 | 375 | ○ |
|  | 45.0 | 18.9 | 36.0 | — | — | — | — | — | | | | | | |
| 27 | 100 | 42 | 90 | — | — | — | — | — | 96 | 530 (crystallized) | — | 80 | 375 | ○ |
|  | 43.1 | 18.1 | 38.8 | — | — | — | — | — | | | | | | |
| 28 | 100 | 50 | 50 | — | — | — | — | — | 65 | 510 | 0 | 79 | 390 | ○ |
|  | 50.0 | 25.0 | 25.0 | — | — | — | — | — | | | | | | |
| 29 | 100 | 50 | 70 | — | — | — | — | — | 92 | 520 | 0 | 78 | 390 | ○ |
|  | 45.5 | 22.7 | 31.8 | — | — | — | — | — | | | | | | |
| 30 | 100 | 55 | 30 | — | — | — | — | — | 47 | 550 | 5 | 80 | 410 | Δ |
|  | 54.0 | 29.7 | 16.2 | — | — | — | — | — | | | | | | |
| 31 | 100 | 75 | 40 | — | — | — | — | — | 67 | 600 | 0 | 83 | 425 | ○ |
|  | 47.6 | 33.3 | 19.0 | — | — | — | — | — | | | | | | |
| 32 | 100 | 75 | 80 | — | — | — | — | — | 97 | 620 | 0 | 85 | 440 | ○ |
|  | 39.2 | 29.4 | 31.4 | — | — | — | — | — | | | | | | |
| 33 | 100 | 85 | 50 | — | — | — | — | — | 91 | 650 | 0 | 83 | 445 | Δ |
|  | 42.6 | 36.2 | 21.3 | — | — | — | — | — | | | | | | |
| 34 | 100 | 35 | 17 | 17 | — | — | — | — | 35 | 450 | 21 | 93 | 330 | x |
|  | 59.2 | 20.7 | 10.1 | 10.1 | — | — | — | — | | | | | | |
| 35 | 100 | 35 | 40 | 55 | — | — | — | — | 56 | 450 | 0 | 115 | 325 | ○ |
|  | 43.5 | 15.2 | 17.4 | 23.9 | — | — | — | — | | | | | | |
| 36 | 100 | 35 | 40 | 65 | — | — | — | — | 55 | 460 | 0 | 123 | 335 (fragile) | ○ |
|  | 41.7 | 14.6 | 16.7 | 27.1 | — | — | — | — | | | | | | |
| 37 | 100 | 37 | 20 | 30 | — | — | — | — | 40 | 450 | 12 | 99 | 315 | Δ |
|  | 53.5 | 19.8 | 10.7 | 16.0 | — | — | — | — | | | | | | |
| 38 | 100 | 40 | 20 | 20 | — | — | — | — | 44 | 460 | 8 | 95 | 345 | Δ |
|  | 55.6 | 22.2 | 11.1 | 11.1 | — | — | — | — | | | | | | |
| 39 | 100 | 40 | 30 | 30 | — | — | — | — | 50 | 460 | 3 | 97 | 340 | Δ |
|  | 50.0 | 20.0 | 15.0 | 15.0 | — | — | — | — | | | | | | |
| 40 | 100 | 45 | 45 | 34 | — | — | — | — | 70 | 480 | 0 | 95 | 360 | ○ |
|  | 44.6 | 20.1 | 20.1 | 15.2 | — | — | — | — | | | | | | |
| 41 | 100 | 50 | 20 | 30 | — | — | — | — | 47 | 500 | 5 | 103 | 400 | Δ |
|  | 50.0 | 25.0 | 10.0 | 15.0 | — | — | — | — | | | | | | |
| 42 | 100 | 50 | 30 | 20 | — | — | — | — | 53 | 500 | 2 | 88 | 405 | Δ |
|  | 50.0 | 25.0 | 15.0 | 10.0 | — | — | — | — | | | | | | |
| 43 | 100 | 50 | 40 | 10 | — | — | — | — | 67 | 510 | 0 | 85 | 410 | ○ |
|  | 50.0 | 25.0 | 20.0 | 5.0 | — | — | — | — | | | | | | |
| 44 | 100 | 50 | 45 | 55 | — | — | — | — | 69 | 470 | 0 | 112 | 350 | ○ |
|  | 40.0 | 20.0 | 18.0 | 22.0 | — | — | — | — | | | | | | |
| 45 | 100 | 50 | 45 | 65 | — | — | — | — | 67 | 490 | 0 | 121 | 355 (fragile) | ○ |
|  | 38.5 | 19.2 | 17.3 | 25.0 | — | — | — | — | | | | | | |
| 46 | 100 | 50 | 63 | 40 | — | — | — | — | 87 | 480 | 0 | 98 | 365 | ○ |
|  | 39.5 | 19.8 | 24.9 | 15.8 | — | — | — | — | | | | | | |
| 47 | 100 | 55 | 20 | 30 | — | — | — | — | 45 | 540 | 6 | 87 | 400 | Δ |
|  | 54.1 | 29.7 | 10.8 | 5.4 | — | — | — | — | | | | | | |
| 48 | 100 | 55 | 55 | 10 | — | — | — | — | 77 | 540 | 0 | 89 | 395 | ○ |
|  | 45.5 | 25.0 | 25.0 | 4.5 | — | — | — | — | | | | | | |
| 49 | 100 | 55 | 55 | 30 | — | — | — | — | 78 | 540 | 0 | 97 | 390 | ○ |
|  | 41.7 | 22.9 | 22.9 | 12.5 | — | — | — | — | | | | | | |
| 50 | 100 | 55 | 55 | 55 | — | — | — | — | 78 | 550 | 0 | 112 | 400 | ○ |
|  | 37.7 | 20.8 | 20.8 | 20.8 | — | — | — | — | | | | | | |
| 51 | 100 | 55 | 55 | 70 | — | — | — | — | 75 | 570 | 0 | 125 | 415 (fragile) | ○ |
|  | 35.7 | 19.6 | 19.6 | 25.0 | — | — | — | — | | | | | | |
| 52 | 100 | 75 | 40 | 55 | — | — | — | — | 66 | 620 | 0 | 107 | 440 | ○ |
|  | 37.0 | 27.7 | 14.8 | 20.4 | — | — | — | — | | | | | | |
| 53 | 100 | 75 | 40 | 65 | — | — | — | — | 65 | 630 | 0 | 120 | 445 (fragile) | ○ |
|  | 35.7 | 26.8 | 14.3 | 23.2 | — | — | — | — | | | | | | |
| 54 | 100 | 55 | 55 | — | 10 | — | — | — | 79 | 530 | 0 | 91 | 385 | ○ |
|  | 45.0 | 25.0 | 25.0 | — | 4.5 | — | — | — | | | | | | |
| 55 | 100 | 55 | 55 | — | 30 | — | — | — | 80 | 530 | 0 | 104 | 380 | ○ |
|  | 41.7 | 22.9 | 22.9 | — | 12.5 | — | — | — | | | | | | |
| 56 | 100 | 55 | 55 | — | 55 | — | — | — | 78 | 540 | 0 | 120 | 385 | ○ |
|  | 37.7 | 20.8 | 20.8 | — | 20.8 | — | — | — | | | | | | |
| 57 | 100 | 55 | 55 | — | 70 | — | — | — | 78 | 550 | 0 | 133 | 380 (fragile) | ○ |
|  | 35.7 | 19.6 | 19.6 | — | 25.0 | — | — | — | | | | | | |
| 58 | 100 | 55 | 55 | — | — | 10 | — | — | 75 | 560 | 0 | 90 | 395 | ○ |
|  | 45.0 | 25.0 | 25.0 | — | — | 4.5 | — | — | | | | | | |
| 59 | 100 | 55 | 55 | — | — | 30 | — | — | 77 | 580 | 0 | 100 | 415 | ○ |

TABLE 3-continued

| No. | Composition (wt parts) [wt % in lower row] | | | | | | | $V^{4+}/V_{total}$ (%) | Bonding temp. (°C.) | Number of cells formed (per mm²) | Coefficient of thermal expansion ($\times 10^{-7}$/°C.) | Micro-Vickers hardness Hv | Water resistance |
|---|---|---|---|---|---|---|---|---|---|---|---|---|---|
| | $V_2O_5$ | $P_2O_5$ | $Sb_2O_3$ | PbO | $TeO_2$ | BaO | $Tl_2O$ | $As_2O_3$ | | | | | | |
| 60 | 41.7 | 22.9 | 22.9 | — | — | 12.5 | — | — | 77 | 620 | 0 | 106 | 430 | ○ |
|    | 100  | 55   | 55   |    |    | 55   |    |    |    |     |   |     |     |    |
|    | 37.7 | 20.8 | 20.8 | — | — | 20.8 | — | — |    |     |   |     |     |    |
| 61 | 100  | 55   | 55   | — | — | 70   | — | — | 74 | 650 | 0 | 111 | 440 (fragile) | ○ |
|    | 35.7 | 19.6 | 19.6 |   |   | 25.0 |   |   |    |     |   |     |     |    |
| 62 | 100  | 55   | 55   | 30 | 25 | — | — | — | 78 | 550 | 0 | 120 | 390 | ○ |
|    | 37.7 | 20.8 | 20.8 | 11.3 | 9.4 | — | — | — |    |     |   |     |     |    |
| 63 | 100  | 55   | 55   | 35 | 30 | — | — | — | 75 | 560 | 0 | 128 | 390 (fragile) | ○ |
|    | 36.4 | 20.0 | 20.0 | 12.7 | 10.9 | — | — | — |    |     |   |     |     |    |
| 64 | 100  | 55   | 55   | 30 | — | 25 | — | — | 76 | 600 | 0 | 108 | 415 | ○ |
|    | 37.7 | 20.8 | 20.8 | 11.3 | — | 9.4 | — | — |    |     |   |     |     |    |
| 65 | 100  | 55   | 55   | 35 | — | 30 | — | — | 77 | 630 | 0 | 116 | 420 (fragile) | ○ |
|    | 36.4 | 20.0 | 20.0 | 12.7 | — | 10.9 | — | — |    |     |   |     |     |    |
| 66 | 100  | 55   | 55   | — | 30 | 25 | — | — | 78 | 590 | 0 | 111 | 405 | ○ |
|    | 37.7 | 20.8 | 20.8 | — | 11.3 | 9.4 | — | — |    |     |   |     |     |    |
| 67 | 100  | 55   | 55   | — | 30 | 35 | — | — | 78 | 630 | 0 | 117 | 420 (fragile) | ○ |
|    | 36.4 | 20.0 | 20.0 | — | 10.9 | 12.7 | — | — |    |     |   |     |     |    |
| 68 | 100  | 55   | 55   | 20 | 20 | 15 | — | — | 77 | 570 | 0 | 115 | 415 | ○ |
|    | 37.7 | 20.8 | 20.8 | 7.5 | 7.5 | 5.7 | — | — |    |     |   |     |     |    |
| 69 | 100  | 55   | 55   | 15 | 30 | 10 | — | — | 77 | 560 | 0 | 119 | 405 | ○ |
|    | 37.7 | 20.8 | 20.8 | 5.7 | 11.3 | 3.8 | — | — |    |     |   |     |     |    |
| 70 | 100  | 55   | 55   | 20 | 30 | 20 | — | — | 74 | 550 | 0 | 127 | 410 (fragile) | ○ |
|    | 35.7 | 19.6 | 19.6 | 7.1 | 10.7 | 7.1 | — | — |    |     |   |     |     |    |
| 71 | 100  | 35   | 17   | — | — | — | 17 | — | 44 | 430 | 15 | 99 | 325 | x |
|    | 59.1 | 20.7 | 10.1 |   |   |   | 10.1 |   |    |     |    |    |     |    |
| 72 | 100  | 35   | 40   | — | — | — | 17 | — | 78 | 440 | 0 | 92 | 320 | ○ |
|    | 52.1 | 18.2 | 20.8 |   |   |   | 8.9 |   |    |     |   |    |     |    |
| 73 | 100  | 35   | 40   | — | — | — | 30 | — | 86 | 430 | 0 | 112 | 315 | ○ |
|    | 48.8 | 17.1 | 19.5 |   |   |   | 14.6 |   |    |     |   |     |     |    |
| 74 | 100  | 35   | 40   | — | — | — | 40 | — | 91 | 430 (crystallized) | — | 120 | 300 | △ |
|    | 46.5 | 16.2 | 18.6 |   |   |   | 18.6 |   |    |     |   |     |     |    |
| 75 | 100  | 35   | 17   | 9 | — | — | 9 | — | 37 | 450 | 28 | 87 | 330 | x |
|    | 58.8 | 20.6 | 10.0 | 5.3 |   |   | 5.3 |   |    |     |    |    |     |    |
| 76 | 100  | 37   | 20   | 20 | — | — | 10 | — | 50 | 440 | 3 | 89 | 330 | △ |
|    | 53.5 | 19.8 | 10.7 | 10.7 |   |   | 10.7 |   |    |     |   |    |     |    |
| 77 | 100  | 42   | 19   | 19 | — | — | 5 | — | 48 | 450 | 4 | 86 | 340 | △ |
|    | 54.1 | 22.7 | 10.3 | 10.3 |   |   | 2.7 |   |    |     |   |    |     |    |
| 78 | 100  | 45   | 45   | 20 | — | — | 10 | — | 80 | 460 | 0 | 100 | 345 | ○ |
|    | 45.5 | 20.5 | 20.5 | 9.1 |   |   | 4.5 |   |    |     |   |     |     |    |
| 79 | 100  | 50   | 50   | 25 | — | — | 25 | — | 89 | 470 | 0 | 110 | 355 | ○ |
|    | 40.0 | 20.0 | 20.0 | 10.0 |   |   | 10.0 |   |    |     |   |     |     |    |
| 80 | 100  | 50   | 62   | 25 | — | — | 13 | — | 93 | 480 | 0 | 103 | 360 | ○ |
|    | 40.0 | 20.0 | 24.8 | 10.0 |   |   | 5.2 |   |    |     |   |     |     |    |
| 81 | 100  | 60   | 50   | — | 30 | — | 30 | — | 94 | 490 | 0 | 125 | 335 | ○ |
|    | 37.0 | 22.2 | 18.5 | — | 11.1 | — | 11.1 | — |    |     |   |     |     |    |
| 82 | 100  | 60   | 50   | — | 30 | — | 40 | — | 96 | 490 (crystallized) | — | 131 | 325 | △ |
|    | 35.7 | 21.4 | 17.9 | — | 10.7 | — | 14.3 | — |    |     |   |     |     |    |
| 83 | 100  | 50   | 50   | 25 | — | — | — | 30 | 96 | 460 | 0 | 110 | 360 | ○ |
|    | 39.2 | 19.6 | 19.6 | 9.8 | — | — | — | 11.8 |    |     |   |     |     |    |
| 84 | 100  | 50   | 50   | 25 | — | — | — | 40 | 97 | 460 (crystallized) | — | 118 | 350 | ○ |
|    | 37.7 | 18.9 | 18.9 | 9.4 | — | — | — | 15.1 |    |     |   |     |     |    |
| 85 | 100  | 60   | 50   | — | 30 | — | — | 30 | 95 | 500 | 0 | 117 | 350 | ○ |
|    | 37.0 | 22.2 | 18.5 | — | 11.1 | — | — | 11.1 |    |     |   |     |     |    |
| 86 | 100  | 60   | 50   | — | 30 | — | — | 40 | 97 | 500 (crystallized) | — | 123 | 335 | ○ |
|    | 35.7 | 21.4 | 17.9 | — | 10.7 | — | — | 14.3 |    |     |   |     |     |    |
| 87 | 100  | 60   | 50   | — | — | — | 15 | 15 | 86 | 510 | 0 | 108 | 365 | ○ |
|    | 41.7 | 25.0 | 20.8 | — | — | — | 6.3 | 6.3 |    |     |   |     |     |    |
| 88 | 100  | 60   | 50   | — | — | — | 20 | 20 | 91 | 510 (crystallized) | — | 112 | 360 | ○ |
|    | 40.0 | 24.0 | 20.0 | — | — | — | 8.0 | 8.0 |    |     |   |     |     |    |

The bonding glass for magnetic head according to the present invention is now described.

The compositions and properties of the glass samples examined are shown in Tables 3 (1)–(8). The glass compositions shown in the tables represent the ratios of the components calculated as the oxides mentioned above. Each of the glass samples was prepared by mixing the predetermined amounts of the glass materials, fusing the mixture in an electric furnace at 1,000°–1,100° C. for 1-2 hours and casting the glass melt into a preheated receiver jig to form a glass block. The glass properties were determined in the following ways.

(1) Reduced ion ratio ($V^{4+}/V_{total}$) of element vanadium

The concentrations of tetravalent vanadium ($V^{4+}$) and total element vanadium ($V_{total}$) were analyzed by redox titration to determine the reduced ion ratio ($V^{4+}/V_{total}$) of element vanadium.

(2) Bonding temperature

Assuming glass bonding in a magnetic head, the temperature at which the glass viscosity becomes $10^3$–$10^5$ P or close thereto was determined.

(3) Number of cells generated

A pair of 20×15×1 mm glass plates were immersed in water for 0.5 hour, then joined together and left in nitrogen at said bonding temperature for 20 minutes. By observing a section of the bonded portion, the average number of cells generated per unit area was determined.

(4) Coefficient of thermal expansion

Measurement was made on a 5 mm-diameter, 30 mm long glass rod by using a thermal dilatometer in the atmosphere at a heating rate of 5° C./min. The coefficient of thermal expansion was measured within the temperature range of from 50° C. to the temperature which is 20° C. lower than transition temperature.

(5) Micro-Vickers hardness Hv.

Measurement was made under the conditions of penetrator load=100 gf and loading time=15 sec. Fragility was determined from the degree and state of rupture of glass.

(6) Water resistance

Water resistance of each glass sample was evaluated from the change of glass surface and the rate of loss in weight when a glass piece worked into a cube measuring 5 mm in each side was immersed in 40 cc of distilled water of 70° C. for 2 hours. In evaluation ranking, ○ mark was given when there was noted no change of glass surface nor loss in weight, Δ mark was given when corrosion of the glass surface by water was noted although there was observed little loss in weight, and x mark was given when there were noted both change of glass surface and loss in weight.

Figure 19:
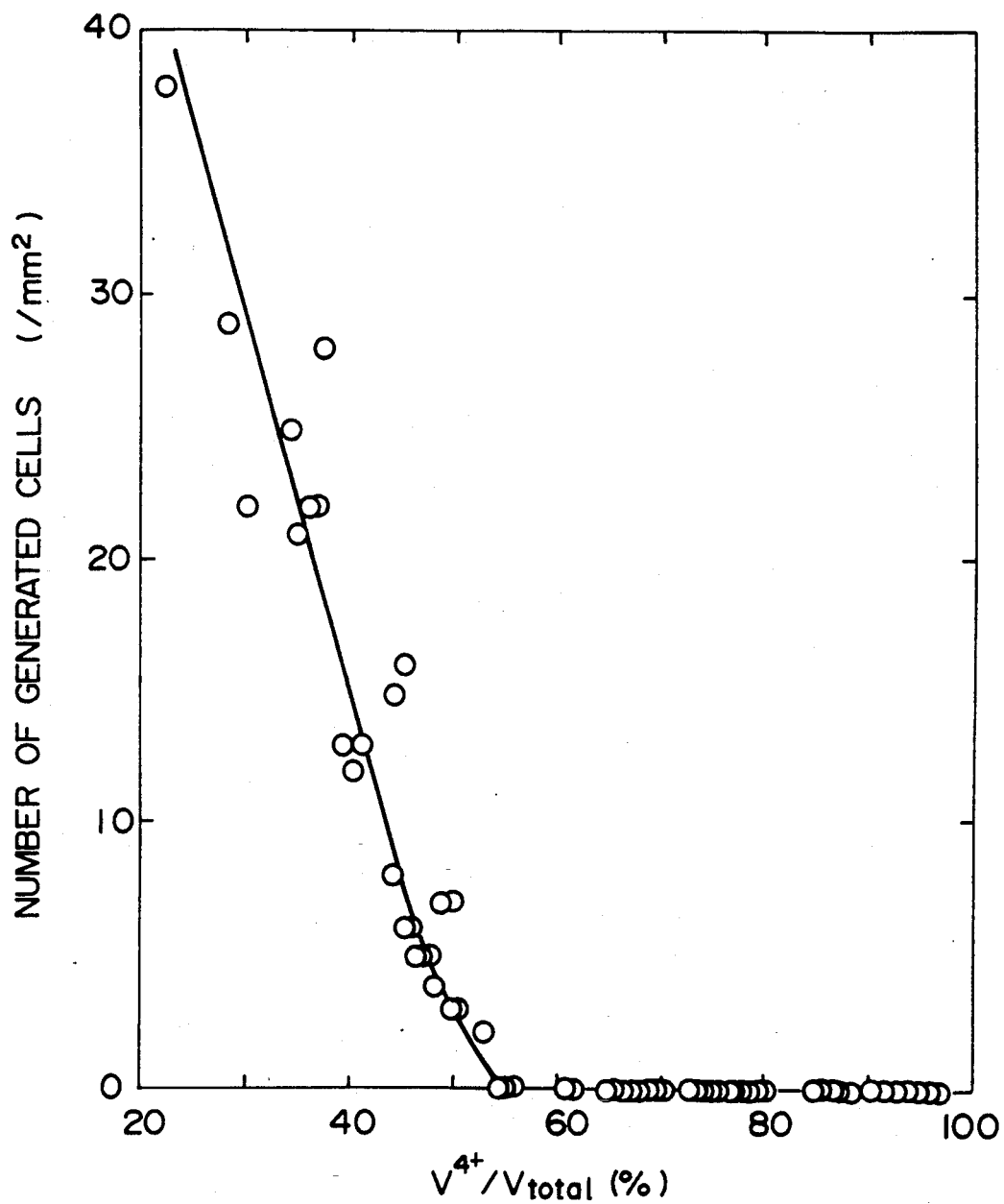
FIG. 19 is a graph showing the relation between the ratio of reduced ions of vanadium ($V^{4+}/V_{total}$) in oxide type glass containing element vanadium as main constituent and the number of cells generated in the course of glass bonding.
Figure 20:
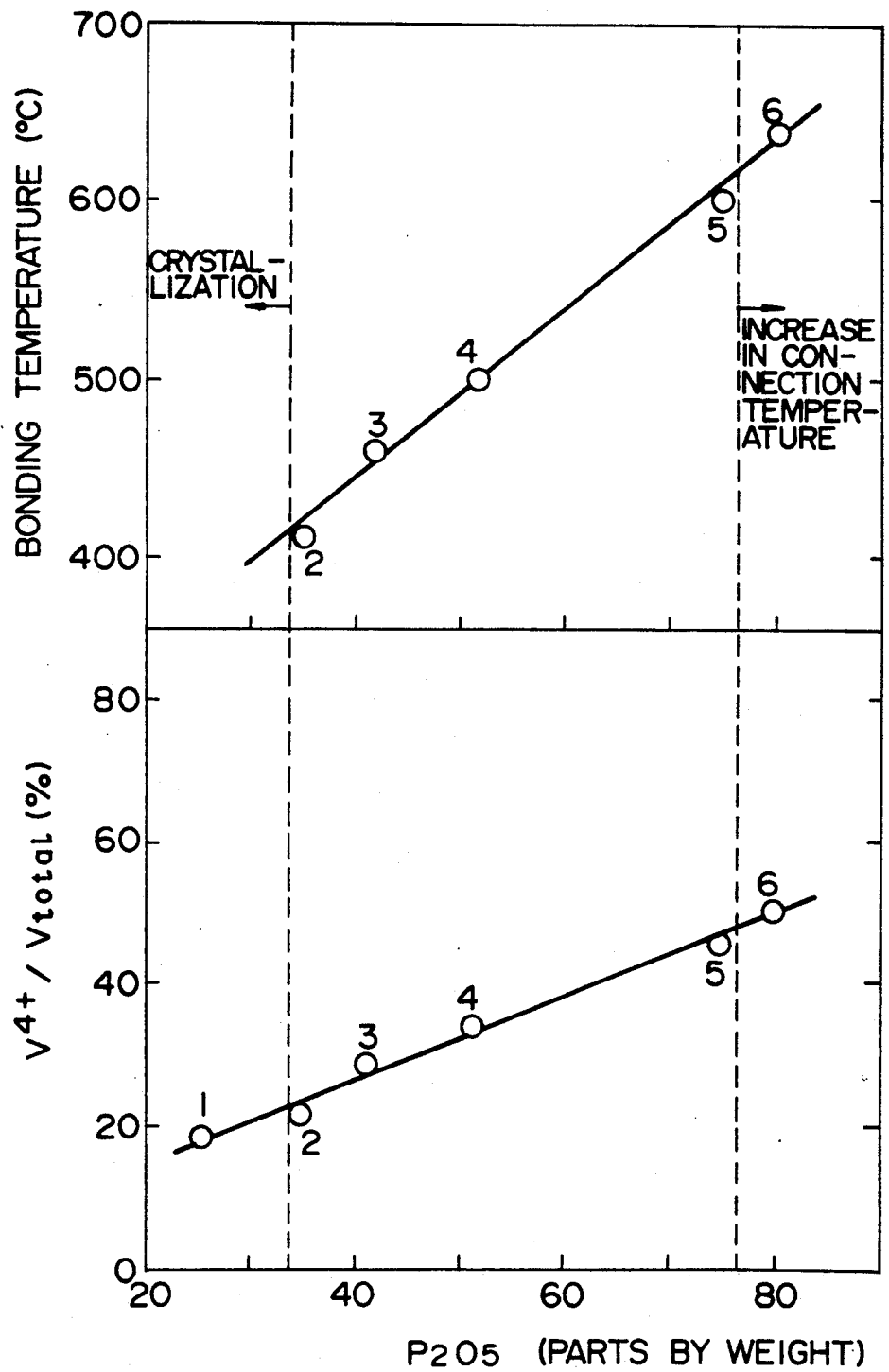
FIG. 20 is a graph showing the relation between $P_2O_5$ content and properties of said glass.

FIG. 19 is a graphic representation of the relation between $V^{4+}/V_{total}$ of glass and number of cells generated shown in Table 3. It is seen that the number generated shown in Table 3. It is seen that the number of cells generated decreases as $V^{4+}/V_{total}$ of glass increases, and when the latter exceeds 55%, no cell is generated. Considering improvement of water resistance, prevention of crystallization and prevention of elevation of bonding temperature, the preferred glass composition is one comprising 100 parts by weight of $V_2O_5$, 35-75 parts by weight of $P_2O_5$ and 40-80 parts by weight of $Sb_2O_3$. FIG. 20 shows the relation between $P_2O_5$ content and glass properties. The figures given close to the plots in the graph indicate glass sample Nos. in Table 3. These glass samples are composed of $V_2O_5$ and $P_2O_5$. They are not satisfactory with regard to number of cells generated and water resistance but useful for examining the effect of $P_2O_5$. When the content of $P_2O_5$ is low, it is possible to lower the bonding temperature, but a $P_2O_5$ content less than 35 parts by weight tends to cause crystallization of glass and is unsuited for preparation of bonding glass. On the other hand, when the content of $P_2O_5$ is high, $V^{4+}/V_{total}$ elevates and the number of cells generated can be lessened, but when the $P_2O_5$ content exceeds 75 parts by weight, the bonding temperature becomes excessively high and the glass with such high $P_2O_5$ content can not be applied to manufacture of magnetic heads using a magnetic film with high saturation magnetic flux density such as shown in Table 1. The same obtains with the multiple-component glasses such as one comprising $V_2O_5$, $P_2O_5$ and $Sb_2O_3$. For instance, the glass of No. 7 with a $P_2O_5$ content less than 35 parts by weight is crystallized, while the glass of No. 33 with a $P_2O_5$ content exceeding 75 parts by weight is too high in bonding temperature. This No. 33 glass is also poor in water resistance. In view of this, the recommendable content of $P_2O_5$ is 35-75 parts by weight to 100 parts by weight of $V_2O_5$.

Figure 21:
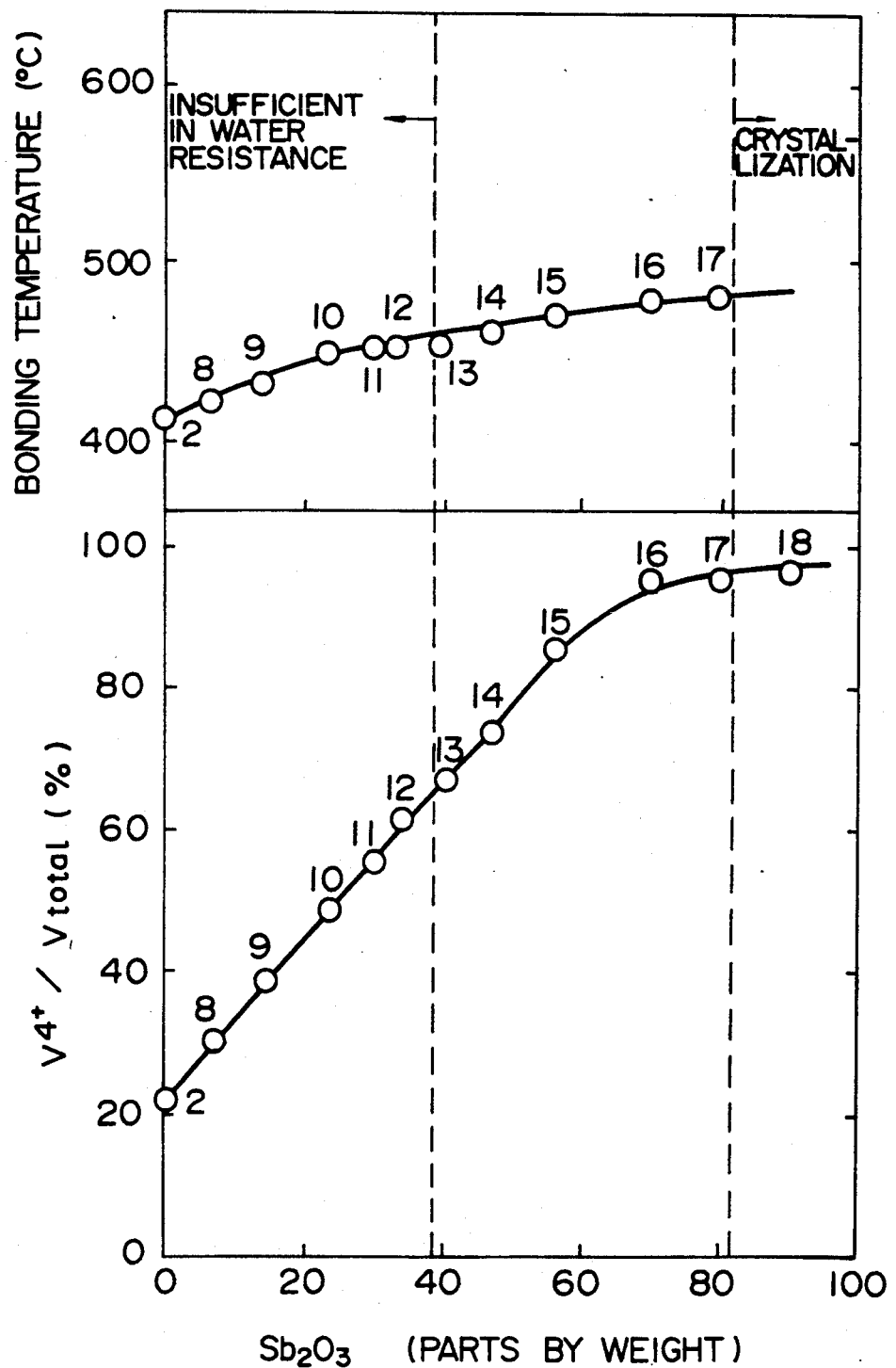
FIG. 21 is a graph showing the relation between $Sb_2O_3$ content and properties of said glass.

FIG. 21 shows the relation between $Sb_2O_3$ content and glass properties. The figures given close to the plots in the graph of FIG. 21 indicate glass sample Nos. in Table 3. It is seen that with increase of the $Sb_2O_3$ content, $V^{4+}/V_{total}$ also increases linearly, but after it reaches 90%, it increases in a gentle curve. With reference to the linear section alone, it is noted that one element of antimony reduces two elements of vanadium. It was also confirmed that the similar phenomenon is observed with other glass samples than the one shown in FIG. 21. It is therefore considered that there takes place the following reaction with addition of element antimony:

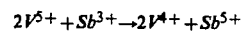

$$2V^{5+}+Sb^{3+} \rightarrow 2V^{4+}+Sb^{5+}$$

From this reaction formula and the data given in FIG. 20, $V^{4+}/V_{total}$ can be presumed. That is, it is possible to control formation of tetravalent vanadium and to thereby inhibit generation of cells during the glass bonding operation. Further, $Sb_2O_3$, unlike $P_2O_5$, gives little influence to bonding temperature. However, when the $Sb_2O_3$ content is less than 40 parts by weight, there can not be obtained satisfactory water resistance as the glass samples of Nos. 8-12, 19-22, 30, 34, 37-39, 41, 42, 47, 71 and 75-77. On the other hand, when the $Sb_2O_3$ content exceeds 80 parts by weight, there takes place crystallization as in the glass samples of Nos. 18 and 27. In view of the above, the appropriate content of $Sb_2O_3$ in the bonding glass is 40-80 parts by weight for 100 parts by weight of $V_2O_5$.

Further, for achieving improvement of vitrification and chemical stability, control of coefficient of thermal expansion and lowering of bonding temperature, it is recommended to contain at least one of PbO, $TeO_2$, BaO, $Tl_2O$ and $As_2O_3$ in the glass composition. It is to be noted, however, that when one or more of PbO, $TeO_2$ and BaO are contained in an amount exceeding 55 parts by weight to 100 parts by weight of $V_2O_5$, the obtained glass proves to be fragile like the glass samples of Nos. 36, 45, 51, 53, 57, 61, 63, 65, 67 and 70. Such glass is hard to work and unsuited for use as bonding glass for magnetic head. Thus, the recommended content of PbO, $TeO_2$ and/or BaO combined is less than 55 parts by weight to 100 parts by weight of $V_2O_5$. Also, when at least one of $Tl_2O$ and $As_2O_3$ is contained in an amount exceeding 30 parts by weight to 100 parts by weight of $V_2O_5$, there takes place crystallization and/or water resistance is deteriorated as the glass samples of Nos. 74, 82, 84, 86 and 88. Therefore, the content of $Tl_2O$ and $As_2O_3$ combined should preferably be not greater than 30 parts by weight to 100 parts by weight of $V_2O_5$.

From the foregoing, it was determined that of the glass samples shown in Table 3, those favorable for use as bonding glass for magnetic head are the ones designated by Nos. 13-17, 23-26, 28, 29, 31, 32, 35, 40, 43, 44, 46, 48-50, 52, 54-56, 58-60, 62, 64, 66, 68, 69, 72, 73, 78-81, 83, 85 and 87. In the Examples, there were selected from these glass samples the ones which were regarded as having the appropriate bonding temperature and thermal expansion coefficient, by considering thermal expansion coefficients of the magnetic film and its support used in magnetic head and limit heat withstanding temperature of the magnetic film. As the Comparative Examples, there were selected, from the glass samples shown in Table 1 excepting those of the above-mentioned Nos., the ones which were considered to have the appropriate bonding temperature and thermal expansion coefficient. There were also used the conventional $PbO-B_2O_3$ based glasses shown in Table 4. The glass properties shown in this table were determined according to the same determination and evaluation methods as used for the glass samples shown in Table 3. The bonding glass samples for magnetic head according to the present invention shown above far excel the conventional glasses shown in Table 4 in water resistance, and also a comparison of these glasses having the same bonding temperature points to superiority of the glass compositions of this invention over the conventional ones in mechanical properties such as hardness.

the film was noted. Melt molded $SiO_2$ glass (quartz glass) was used as target for sputtering for the non magnetic gap material of No. I in Table 5. The sputtered film formed by using a target has been popularly employed as non-magnetic gap material for magnetic head. In the case of the non-magnetic gap materials of Nos. II–XII, there was used a target obtained by molding a mixture of $SiO_2$ glass (quartz glass) powder, $Al_2O_3$ powder or $ZrO_2$ powder and $V_2O_5$ powder or said glass

TABLE 4

| No. | Composition (wt %) | | | | | | | | | | Bonding temp. (°C.) | Number of cells formed (per mm$^2$) | Coefficient of thermal expansion ($\times 10^{-7}$/°C.) | Micro-Vickers hardness Hv | Water resistance |
|---|---|---|---|---|---|---|---|---|---|---|---|---|---|---|---|
| | PbO | $B_2O_3$ | $SiO_2$ | ZnO | $Al_2O_3$ | $TeO_2$ | CdO | $Tl_2O$ | $Bi_2O_3$ | $K_2O$ | | | | | |
| (89) | 75 | 15 | 3 | 7 | — | — | — | — | — | — | 480 | 0 | 100 | 330 (fragile) | X |
| (90) | 79 | 12 | 3 | 5 | 1 | — | — | — | — | — | 470 | 0 | 102 | 300 (fragile) | X |
| (91) | 78 | 12 | 4 | 2 | 4 | — | — | — | — | — | 480 | 0 | 98 | 325 (fragile) | X |
| (92) | 72 | 12 | 5 | 6 | 5 | — | — | — | — | — | 600 | 0 | 90 | 350 | Δ |
| (93) | 78 | 11 | 3 | — | — | — | 8 | — | — | — | 440 | 0 | 112 | 290 (fragile) | X |
| (94) | 75 | 8 | 4 | 6 | 2 | — | 5 | — | — | — | 480 | 0 | 105 | 310 (fragile) | X |
| (95) | 76 | 11 | 3 | — | — | 10 | — | — | — | — | 460 | 0 | 125 | 270 (fragile) | X |
| (96) | 78 | 7 | 8 | — | — | 5 | — | — | — | 2 | 450 | 0 | 130 | 280 (fragile) | X |
| (97) | 75 | 7 | 10 | — | — | 5 | — | — | — | 2 | 480 | 0 | 120 | 290 (fragile) | X |
| (98) | 78 | 7 | 8 | — | 2 | — | — | 5 | — | — | 470 | 0 | 108 | 305 (fragile) | X |
| (99) | 40 | 15 | 8 | 1 | — | — | — | 24 | 12 | — | 470 | 0 | 120 | 325 (fragile) | X |

TABLE 5

| No. | Target composition for sputtering (wt %) | Heat resistance of sputtered film | | | Remarks |
|---|---|---|---|---|---|
| | | 500° C. | 600° C. | 650° C. | |
| I | $SiO_2$ glass (quartz glass) | ○ | ○ | ○ | Conventional gap material |
| II | $SiO_2$ glass - $V_2O_5$<br>50         50 | ○ | ○ | ○ | Target is sintered body of powder mixture |
| III | $SiO_2$ glass - No. 3 glass<br>50         50 | ○ | ○ | ○ | Target is sintered body of powder mixture |
| IV | $SiO_2$ glass - No. 14 glass<br>50         50 | ○ | ○ | ○ | Target is sintered body of powder mixture |
| V | $SiO_2$ glass - No. 23 glass<br>50         50 | ○ | ○ | ○ | Target is sintered body of powder mixture |
| VI | $SiO_2$ glass - No. 38 glass<br>50         50 | ○ | ○ | ○ | Target is sintered body of powder mixture |
| VII | 25         75 | ○ | ○ | X | Target is sintered body of powder mixture |
| VIII | $SiO_2$ glass - No. 69 glass<br>50         50 | ○ | ○ | ○ | Target is sintered body of powder mixture |
| IX | $SiO_2$ glass - No. 75 glass<br>50         50 | ○ | ○ | ○ | Target is sintered body of powder mixture |
| X | $SiO_2$ glass - No. 83 glass<br>50         50 | ○ | ○ | ○ | Target is sintered body of powder mixture |
| XI | $Al_2O_3$ glass - No. 38 glass<br>50         50 | ○ | ○ | ○ | Target is sintered body of powder mixture |
| XII | $ZrO_2$ glass - No. 38 glass<br>50         50 | ○ | ○ | ○ | Target is sintered body of powder mixture |

The non-magnetic gap materials used in the Examples are shown in Table 5. These non-magnetic gap materials were formed by sputtering. The compositions shown in the table are not those of the non-magnetic gap materials but those of the targets for sputtering used for forming the gap materials. The No. 3 glass, No. 14 glass, No. 23 glass, No. 38 glass, No. 69 glass, No. 75 glass and No. 83 glass referred to in the table correspond to those shown in Table 3. Heat resistance of the sputtered films was determined by heating each sputtered film to 550° C., 600° C. and 650° C. in a nitrogen atmosphere, leaving the film in this state for 0.5 hour and, after cooling, observing the film under a scanning electron microscope. The ○ and x system was adopted as the criterion of judgement of heat resistance, with ○ mark given when no indication of fusion of the sputtered film was noted and x mark given when an indication of fusion of powder and sintering the molded mass by a hot press. Mixing of $V_2O_5$ powder or said glass powder in the target is intended to improve reactivity with the bonding glass by having the components of bonding glass incorporated in the sputtered film. The sputtered film formed by using such a target stays in the form of a composite oxide or oxide mixture comprising the elements composing the target. Heat resistance of such sputtered films is high in the temperature range up to 650° C. in the case of using non-magnetic gap materials other than that of No. VII, and the limit heat withstanding temperature of said films is higher than that of the magnetic films shown in Table 1, so that stable formation of gap is possible. In case the non-magnetic gap material of No. VII was used, the film was fused at 650° C. due to high content of the bonding glass. However, since the film retains good heat resistance in the temperature range up to 600° C., gap regulation at or below this temperature is possible.

film near the magnetic gap had an indication of corrosion by the bonding glass.

TABLE 6

|  | Bonding glass No. | Fraction defective (%) | | | Head chip strength (gf) | Tape sliding test (wear characteristics) | | |
|---|---|---|---|---|---|---|---|---|
|  |  | Working | Cells | Corrosion |  | 3.75 m/sec | 5.8 m/sec | 11 m/sec |
| Example | 13 | 7 | 18 | 0 | 39 | ○ | ○ | x |
|  | 14 | 7 | 15 | 0 | 41 | ○ | ○ | x |
|  | 15 | 5 | 12 | 0 | 42 | ○ | ○ | ○ |
|  | 16 | 5 | 10 | 0 | 40 | ○ | ○ | ○ |
|  | 17 | 6 | 10 | 0 | 41 | ○ | ○ | ○ |
|  | 40 | 7 | 12 | 0 | 43 | ○ | ○ | ○ |
|  | 46 | 5 | 10 | 0 | 45 | ○ | ○ | ○ |
|  | 72 | 8 | 14 | 0 | 39 | ○ | ○ | x |
|  | 78 | 6 | 10 | 0 | 42 | ○ | ○ | ○ |
|  | 80 | 5 | 10 | 0 | 43 | ○ | ○ | ○ |
| Comparative Examples | 10 | 10 | 51 | 0 | 38 | ○ | ○ | x |
|  | 21 | 8 | 50 | 0 | 40 | ○ | ○ | ○ |
|  | 34 | 12 | 64 | 0 | 43 | ○ | ○ | x |
|  | 38 | 9 | 55 | 0 | 45 | ○ | ○ | ○ |
|  | 71 | 11 | 60 | 0 | 38 | ○ | ○ | x |
|  | 75 | 13 | 65 | 0 | 39 | ○ | ○ | x |
|  | 76 | 8 | 52 | 0 | 40 | ○ | ○ | x |
|  | (89) | 11 | 5 | 42 | 35 | ○ | x | x |
|  | (90) | 14 | 3 | 47 | 30 | x | x | x |
|  | (91) | 12 | 6 | 40 | 33 | ○ | x | x |
|  | (94) | 12 | 4 | 44 | 34 | x | x | x |
|  | (98) | 10 | 5 | 42 | 34 | ○ | x | x |

The magnetic heads shown in FIGS. 1-3 were made by using the magnetic films shown in Table 1, the supports shown in Table 2, the bonding glasses shown in Tables 3 and 4 and the non-magnetic gap materials shown in Table 5, and they were subjected to evaluation concerning the matters mentioned in the following descriptions of the Examples.

EXAMPLE 1

There were used a Co-based amorphous alloy for the magnetic film, single-crystal Mn-Zn ferrite for the support and $SiO_2$ glass as the non-magnetic gap material. As for the bonding glass, there were selected the suitable ones from the glass samples shown in Tables 3 and 4 by taking into consideration the limit heat withstanding temperature of the magnetic film and thermal expansion coefficients of the magnetic film and its support. The magnetic heads of the structure shown in FIG. 1 were manufactured by using said materials. The operating temperatures in the manufacture, that is, glass charging temperature and glass bonding temperature were selected in accordance with the bonding temperatures of the glasses shown in Tables 3 and 4. The results of actual use tests on the manufactured magnetic heads are shown in Table 6. Each fraction defective show here is the one relating to the bonding glasses. Regarding this fraction defective, the following items (1), (2) and (3) were examined successively. The fraction defective for each item was based on the number of the heads manufactured when the production yield was supposed to be 100%.

(1) Fraction defective relating to working: ratio of the heads which have suffered glass fracture in the course of head working.
(2) Fraction defective relating to cells: ratio of those of the heads obtained from said head working in which the presence of the cells of 3 μm or greater was observed in the sliding face of the glass bonded portion.
(3) Fraction defective relating to corrosion of magnetic film: ratio of the heads which were free of cells in the sliding face but in which the magnetic The "head chip strength" shows the maximum load that the chip of the finished magnetic head can endure. The "tape sliding test" was conducted by setting the finished magnetic head on a cylinder in a VTR and letting a high-coercive-force metallized tape for Hi8-VTR run at relative speeds of 3.75 m/sec, 5.8 m/sec and 11 m/sec for a period of 300 hours continuously. The wear characteristics of the magnetic head were evaluated from the degree and state of dent(s) and scratch(es) at the glass bonded area by observing the sliding face of the magnetic head. The result of evaluation was expressed either by ○ mark which indicates satisfactory result or by x mark which indicates unsatisfactory result.

The magnetic heads using the conventional PbO-$B_2O_3$ based glass Nos. (89)–(91), (94) and (98) were low in fraction defective relating to cells but exceedingly high in fraction defective relating to corrosion of magnetic film. Also, in these magnetic heads, due to poor mechanical properties of the glasses, the fraction defective relating to working was high and the head chip strength was low. So, it needs to take great care for handling of the head chips. In the tape sliding test when the tape was run at a relative speed of 3.75 m/sec, satisfactory results were obtained in case of using glasses of Nos. (89), (91) and (98). However, in case of using glasses of Nos. (90) and (94), the degree of wear and scuff at the glass bonded area was large due to low hardness of the glasses. When the relative speed of the tape was increased, all of said glasses suffered faster and wider wear, and when the relative speed was raised to 11 m/sec, there often occurred rupture of magnetic head. On the other hand, in case of using the glass samples of Nos. 10, 21, 34, 38, 71, 75 and 76 in which the ratio of tetravalent vanadium to the total amount of vanadium was 55%, although the magnetic film was not corroded, a large number of cells were generated and the fraction defective of the products was notably high. In this case, therefore, the production yield is very low, making the magnetic heads fairly costly. However, when using these glasses, because of their excellent mechanical properties, the head chip strength was higher and the better results were obtained in the tape sliding test than when using said conventional PbO-B$_2$O$_3$ based glasses. Especially when using the glasses of Nos. 21 and 38 having a micro-Vickers hardness Hv above 340, the obtained magnetic head showed good netic heads, that is, glass charging temperature and glass bonding temperature were determined in conformity to the bonding temperatures of the glasses shown in Table 3. The results of the practical use tests on the manufactured magnetic heads are shown in Table 7. Evaluation of the magnetic heads was made in the same way as in Example 1.

TABLE 7

|  | Bonding glass No. | Non-magnetic gap material No. | Fraction defective (%) | | | Head chip strength (gf) | Tape sliding test (wear characteristics) | | |
| --- | --- | --- | --- | --- | --- | --- | --- | --- | --- |
|  |  |  | Working | Cells | Corrosion |  | 3.75 m/sec | 5.8 m/sec | 11 m/sec |
| Examples | 46 | I | 6 | 10 | 0 | 45 | ○ | ○ | ○ |
|  |  | II | 3 | 7 | 0 | 48 | ○ | ○ | ○ |
|  |  | III | 3 | 5 | 0 | 53 | ○ | ○ | ○ |
|  |  | IV | 2 | 3 | 0 | 55 | ○ | ○ | ○ |
|  |  | V | 2 | 4 | 0 | 53 | ○ | ○ | ○ |
|  |  | VI | 1 | 3 | 0 | 56 | ○ | ○ | ○ |
|  |  | VII | 0 | 1 | 0 | 60 | ○ | ○ | ○ |
|  |  | VIII | 4 | 6 | 0 | 49 | ○ | ○ | ○ |
|  |  | IX | 2 | 3 | 0 | 52 | ○ | ○ | ○ |
|  |  | X | 2 | 3 | 0 | 55 | ○ | ○ | ○ |
|  |  | XI | 1 | 4 | 0 | 54 | ○ | ○ | ○ |
|  |  | XII | 2 | 3 | 0 | 55 | ○ | ○ | ○ |
| Comparative Examples | 38 | I | 10 | 54 | 0 | 45 | ○ | ○ | ○ |
|  |  | II | 7 | 44 | 0 | 47 | ○ | ○ | ○ |
|  |  | III | 6 | 42 | 0 | 50 | ○ | ○ | ○ |
|  |  | IV | 5 | 40 | 0 | 51 | ○ | ○ | ○ |
|  |  | V | 5 | 41 | 0 | 48 | ○ | ○ | ○ |
|  |  | VI | 6 | 39 | 0 | 51 | ○ | ○ | ○ |
|  |  | VII | 4 | 34 | 0 | 55 | ○ | ○ | ○ |
|  |  | VIII | 5 | 44 | 0 | 47 | ○ | ○ | ○ |
|  |  | XI | 4 | 39 | 0 | 50 | ○ | ○ | ○ |
|  |  | XII | 5 | 40 | 0 | 48 | ○ | ○ | ○ | sliding characteristics in the tape sliding test even when the relative speed of the tape was 11 m/sec. The fact that the fraction defective relating to working was not lowered in spite of good mechanical properties is attributable to the cells in the glass bonded area.

In the present Example, as there were used the glasses in which the ratio of tetravalent vanadium to the total amount of vanadium was higher than 55%, the cells could be markedly reduced and this decrease of cells has led to a significant reduction of fraction defective relating to working. This would greatly improve the production yield and do much for reducing the manufacturing cost of magnetic heads. Also, the glasses used in the Example, like the glasses of Nos. 10, 21, 34, 38, 71, 75 and 76, cause no corrosion of the magnetic film and allow obtainment of the magnetic heads having excellent magnetic properties. Also, in the tape sliding test, most of the magnetic heads obtained in the present Example showed good sliding characteristics even when the relative speed of the tape was 11 m/sec. In these magnetic heads, there were used the glass samples having a micro-Vickers hardness Hv above 340.

EXAMPLE 2

There were used a Co-based amorphous alloy for the magnetic film and an α-Fe$_2$O$_3$ based ceramics for the support, and the materials shown in Table 5 were used as non-magnetic gap material. As for the bonding glass, there was selected the glass sample of No. 46 shown in Table 3, considering limit heat withstanding temperature of the magnetic film and thermal expansion coefficients of the magnetic film and its support. The glass of No. 38 was used for the comparative examples. The magnetic heads of the structure shown in FIG. 1 were made by using said materials. Because of use of a non-magnetic material for the support, these magnetic heads showed excellent high frequency characteristics. The operating temperatures in the manufacture of the mag- As a result of manufacturing magnetic heads by using in combination the glass of No. 46 and the non-magnetic gap materials shown in Table 5, it was possible to improve head chip strength and workability by using the non-magnetic gap materials of Nos. II–XII (in Table 5) as compared with the case of using the conventional non-magnetic gap material I (SiO$_2$ glass). The fraction defective relating to cells could also be lessened. This is attributable to the fact that as the main components of bonding glass were contained in the non-magnetic gap materials of Nos. II–XII, the reactivity with the bonding glass was improved to allow more solid bonding and also the generated cells became more easier to run out. Further, use of these non-magnetic gap materials eliminated the risk of corrosion of the magnetic film by the bonding glass. Also, even when using the glass of No. 38 in which the ratio of tetravalent vanadium to the total amount of vanadium was less than 55%, the fraction defective relating to cells could be reduced 10–20% and also head chip strength and workability were improved by use of said non-magnetic gap materials. In this case, however, the fraction defective relating to cells was higher than when using the glass of No. 46. In the tape sliding test, good results were obtained from both types of glass owing to high hardness.

EXAMPLE 3

There were used a Sendust alloy for the magnetic film, a TiO$_2$-NiO-CaO based ceramics for the support and the materials VI (SiO$_2$ glass—No. 38 glass) and I (SiO$_2$ glass) shown in Table 5 as non-magnetic gap material. As for the bonding glass, there were selected the appropriate ones from the glass samples shown in Tables 3 and 4 by giving consideration to limit heat withstanding temperature of the magnetic film and thermal expansion coefficients of the magnetic film and its support. The magnetic heads of the structure shown in FIG. 1 were manufactured by using said materials. The obtained magnetic heads showed excellent high frequency characteristics as those of Example 2. The operating temperatures in the manufacture of magnetic heads, that is, glass charging temperature and glass bonding temperature were selected in accordance with the bonding temperatures of the glasses shown in Tables 3 and 4. The results of the practical use test on the produced magnetic heads are shown in Table 8. Evaluation of the magnetic heads was made in the same way as in Example 1.

lected the suitable ones from the glass samples shown in Table 3, considering limit heat withstanding temperature of the magnetic film and thermal expansion coefficients of the magnetic film and its support. The magnetic heads of the structure shown in FIG. 1 were made by using said materials. The obtained magnetic heads showed excellent high frequency characteristics as those of Example 2. The operating temperatures in the manufacture of these magnetic heads, that is, glass charging temperature and glass bonding temperature were selected in accordance with bonding temperatures of the glasses shown in Table 3. The results of the prac-

TABLE 8

| | Bonding glass No. | Non-magnetic gap material No. | Fraction defective (%) | | | Head chip strength (gf) | Tape sliding test (wear characteristics) | | |
|---|---|---|---|---|---|---|---|---|---|
| | | | Working | Cells | Corrosion | | 3.75 m/sec | 5.8 m/sec | 11 m/sec |
| Examples | 56 | VI | 5 | 4 | 0 | 48 | O | O | O |
| | 62 | | 5 | 3 | 0 | 50 | O | O | O |
| | 69 | | 3 | 5 | 0 | 51 | O | O | O |
| | 81 | | 4 | 3 | 0 | 59 | O | O | X |
| Comparative Examples | 45 | VI | 24 | 5 | 0 | 35 | O | O | X |
| | 51 | | 25 | 3 | 0 | 33 | O | O | X |
| | 57 | | 23 | 4 | 0 | 34 | O | O | X |
| | 63 | | 25 | 5 | 0 | 32 | O | O | X |
| | 70 | | 26 | 4 | 0 | 34 | O | O | X |
| | (95) | I | 25 | 4 | 54 | 26 | X | X | X |
| | (96) | | 20 | 3 | 55 | 28 | X | X | X |
| | (97) | | 19 | 4 | 50 | 30 | X | X | X |
| | (99) | | 16 | 6 | 49 | 33 | O | X | X |

The magnetic heads of comparative examples using the $PbO-B_2O_3$ based glasses of Nos. (95)–(97) and 99 were low in fraction defective relating to cells but high in fraction defective relating to working and fraction defective relating to corrosion of magnetic film. These magnetic heads were also low in head chip strength. Further, no satisfactory results were obtained in the tape sliding test. In the comparative examples using the glasses of Nos. 45, 51, 57, 63 and 70, the fraction defective relating to cells and fraction defective relating to corrosion of magnetic film were low, but due to fragility of these glasses, the fraction defective relating to working was high and also head chip strength was low. Further, the magnetic heads using these glasses failed to show good results in the tape sliding test for high hardness of these glasses. In contrast, the magnetic heads according to the Example of this invention gave good results in all items of evaluation.

EXAMPLE 4

There were used an Fe-C based material for the magnetic film, an MgO-NiO based ceramics for the support and the materials V-VIII of Table 5 as non-magnetic gap material. As for the bonding glass, there were setical use test conducted on the obtained magnetic heads are shown in Table 9. Evaluation of the magnetic heads was made in the same way as in Example 1.

TABLE 9

| | Bonding glass No. | Non-magnetic gap material No. | Fraction defective (%) | | | Head chip strength (gf) | Tape sliding test (wear characteristics) | | |
|---|---|---|---|---|---|---|---|---|---|
| | | | Working | Cells | Corrosion | | 3.75 m/sec | 5.8 m/sec | 11 m/sec |
| Examples | 44 | VII | 1 | 3 | 0 | 58 | O | O | O |
| | 50 | V | 2 | 5 | 0 | 65 | O | O | O |
| | 52 | VIII | 3 | 6 | 0 | 67 | O | O | O |
| | 60 | VIII | 3 | 3 | 0 | 65 | O | O | O |
| | 66 | V | 2 | 5 | 0 | 58 | O | O | O |
| | 68 | V | 1 | 4 | 0 | 60 | O | O | O |
| | 69 | V | 2 | 4 | 0 | 59 | O | O | O |
| | 79 | VII | 3 | 2 | 0 | 56 | O | O | O |
| | 83 | VII | 2 | 2 | 0 | 61 | O | O | O |
| | 85 | VI | 3 | 2 | 0 | 56 | O | O | O |
| | 87 | V | 2 | 4 | 0 | 54 | O | O | O |

As seen from Table 9, even when using an Fe-C based material with high saturation magnetic flux density for the magnetic film, there can be obtained a magnetic head showing good results in all evaluation items as the products of the preceding Examples by using in combination a bonding glass for magnetic head according to this invention and a non-magnetic gap material containing the main components of said bonding glass. These magnetic heads, unlike the conventional products, are very low in fraction defective, high in head chip strength and also excellent in high speed tape slidability. Thus, in accordance with the present invention, there is provided a magnetic head having excellent mass productivity, durability and magnetic properties. Such a magnetic head is greatly conducive to high density recording of the magnetic recording and reproducing apparatus.

EXAMPLE 5

There were used a Co-based amorphous alloy for the magnetic film, an NiO-CoO-TiO$_2$ based ceramics for the support and the materials of Nos. I, VI, XI and XII in Table 5 as non-magnetic gap material. As for the bonding glass, there were selected the suitable ones from the glass samples shown in Tables 3 and 4, considering limit heat withstanding temperature of the magnetic film and thermal expansion coefficients of the magnetic film and its support. The magnetic heads of the structure shown in FIG. 2 were made by using said materials. The obtained magnetic heads, as those of Example 2, showed excellent high frequency characteristics. The glass charging temperature and glass bonding temperature in manufacture of these magnetic heads were selected in accordance with bonding temperatures of the glass samples shown in Tables 3 and 4. The results of the practical use tests on the obtained magnetic heads are shown in Table 10. Evaluation of the magnetic heads was made copying after the way of Example 1.

ceramic material such as Al$_2$O$_3$ or ZrO$_2$ capable of gap control as the non-magnetic gap material if the main components of bonding glass for magnetic head according to this invention are contained in the material. In the head chip strength test and tape sliding test, better results are obtained by use of the glass of No. 79 than when using the glass of No. 35. This is attributable to the better mechanical properties of No. 79 glass than those of No. 35 glass. On the other hand, the magnetic heads of comparative examples using the PbO-B$_2$O$_3$ based glass No. (93) were not improved in fraction defective relating to working, fraction defective relating to corrosion of magnetic film and head chip strength but rather deteriorated in these matters when using the materials VI, XI and XII as non-magnetic gap material.

EXAMPLE 6

There were used a Sendust alloy for the magnetic film, an MnO-NiO based ceramics for the support and the materials of Nos. VI (SiO$_2$ glass—No. 38 glass) and I (SiO$_2$ glass) of Table 5 as non-magnetic gap material.

TABLE 10

| Bonding glass No. | Non-magnetic gap material No. | Fraction defective (%) Working | Cells | Corrosion | Head chip strength (gf) | Tape sliding test (wear characteristics) 3.75 m/sec | 5.8 m/sec | 11 m/sec |
|---|---|---|---|---|---|---|---|---|
| Examples | | | | | | | | |
| 35 | I | 8 | 20 | 0 | 38 | ◯ | ◯ | X |
|  | VI | 4 | 7 | 0 | 46 | ◯ | ◯ | X |
|  | XI | 3 | 7 | 0 | 47 | ◯ | ◯ | X |
|  | XII | 3 | 4 | 0 | 50 | ◯ | ◯ | X |
| 79 | I | 7 | 14 | 0 | 42 | ◯ | ◯ | ◯ |
|  | VI | 3 | 2 | 0 | 55 | ◯ | ◯ | ◯ |
|  | XI | 2 | 2 | 0 | 53 | ◯ | ◯ | ◯ |
|  | XII | 2 | 3 | 0 | 57 | ◯ | ◯ | ◯ |
| Comparative Examples | | | | | | | | |
| (93) | I | 12 | 2 | 58 | 32 | X | X | X |
|  | VI | 16 | 3 | 67 | 30 | X | X | X |
|  | XI | 19 | 3 | 65 | 27 | X | X | X |
|  | XII | 22 | 2 | 68 | 25 | X | X | X |

In the case of the magnetic heads in the present Example using the glasses of Nos. 35 and 79, it was possible to achieve a reduction of fraction defective relating to working and fraction defective relating to cells as well as an improvement of head chip strength by using the materials VI, XI and XII containing the main component of bonding glass for magnetic head according to this invention as non-magnetic gap material. Thus, in accordance with the present Example of this invention, there can be obtained a magnetic head having more excellent properties than the conventional products. In the manufacture of such a magnetic head, it was found that there can be used not only SiO$_2$ glass but also a The magnetic heads of the structure shown in FIG. 2 were manufactured by using said materials and the non-magnetic gap materials and bonding glasses used in Example 3. The obtained magnetic heads, as those of Example 2, showed excellent high frequency characteristics. The operating temperatures in the manufacture of said magnetic heads, that is, glass charging temperature and glass bonding temperature were selected in accordance with bonding temperatures of the glasses shown in Tables 3 and 4. The results of the practical use tests conducted on the obtained magnetic heads are shown in Table 11. Evaluation of the magnetic heads was made after the manner of Example 1.

TABLE 11

| Bonding glass No. | Non-magnetic gap material No. | Fraction defective (%) Working | Cells | Corrosion | Head chip strength (gf) | Tape sliding test (wear characteristics) 3.75 m/sec | 5.8 m/sec | 11 m/sec |
|---|---|---|---|---|---|---|---|---|
| Examples | | | | | | | | |
| 56 | VI | 2 | 5 | 0 | 58 | ◯ | ◯ | ◯ |
| 62 |  | 2 | 6 | 0 | 61 | ◯ | ◯ | ◯ |
| 69 |  | 1 | 7 | 0 | 62 | ◯ | ◯ | ◯ |
| 81 |  | 2 | 5 | 0 | 61 | ◯ | ◯ | X |
| Comparative Examples | | | | | | | | |
| 45 | VI | 20 | 7 | 0 | 42 | ◯ | ◯ | X |
| 51 |  | 19 | 7 | 0 | 41 | ◯ | ◯ | X |
| 57 |  | 16 | 7 | 0 | 40 | ◯ | ◯ | X |
| 63 |  | 18 | 9 | 0 | 41 | ◯ | ◯ | X |
| 70 |  | 19 | 6 | 0 | 40 | ◯ | ◯ | X |
| (95) | I | 15 | 7 | 65 | 32 | X | X | X |
| (96) |  | 13 | 5 | 65 | 35 | X | X | X |

TABLE 11-continued

| Bonding glass No. | Non-magnetic gap material No. | Fraction defective (%) Working | Cells | Corrosion | Head chip strength (gf) | Tape sliding test (wear characteristics) 3.75 m/sec | 5.8 m/sec | 11 m/sec |
|---|---|---|---|---|---|---|---|---|
| (97) | | 13 | 8 | 59 | 36 | X | X | X |
| (99) | | 10 | 9 | 60 | 39 | O | X | X |

In the present Example, there were obtained the similar results to Example 3. The magnetic heads obtained in the present Example, however, were less in fraction defective relating to working and higher in head chip strength than the products of Example 3. This is attributable to good matching of the bonding glass used with the magnetic head structure and support used in the present Example. However, the fraction defective relating to cells was slightly higher. This is considered due to greater likelihood of fouling because of the increased magnetic head working steps in the present Example. There is also the problem that the magnetic film is apt to be corroded by the bonding glass as the magnetic film is bared out by working in this type of magnetic head. For this reason, the fraction defective relating to corrosion of magnetic film was high in the comparative examples using $PbO-B_2O_3$ based glasses of Nos. (95)–(97) and (99). In the Example of this invention, there scarcely occurred corrosion of the magnetic film as in the examples employing the magnetic head of FIG. 1. Thus, according to the present Example, there can be obtained a magnetic head which is excellent not only in mass productivity and reliability but also in magnetic properties.

EXAMPLE 7

There were used an Fe-C based material for the magnetic film and an $NiO-CoO-TiO_2$ based ceramics for the support. As for the bonding glass, there were selected the suitable ones from the glass samples shown in Tables 3 and 4 by giving consideration to limit heat withstanding temperature of the magnetic film and thermal expansion coefficients of the magnetic film and its support. As the non-magnetic gap material, there was used the material of No. IV in Table 5 ($SiO_2$ glass—No. 14 glass) in case of using the glasses of Table 3 and the conventional non-magnetic gap material I ($SiO_2$ glass) in case of using the glasses of Table 4. The magnetic heads of the structure shown in FIG. 2 were made by using said materials. The obtained magnetic heads showed excellent high frequency characteristics as the products of Example 2. In the manufacture of these magnetic heads, the glass charging temperature and glass bonding temperature were selected in accordance with the bonding temperatures of the glasses shown in Tables 3 and 4. The results of the practical use tests on the produced magnetic heads are shown in Table 12. Evaluation of the magnetic heads was made according to the same methods as used in Example 1.

TABLE 12

| Bonding glass No. | Fraction defective (%) Working | Cells | Corrosion | Head chip strength (gf) | Tape sliding test (wear characteristics) 3.75 m/sec | 5.8 m/sec | 11 m/sec |
|---|---|---|---|---|---|---|---|
| Examples | | | | | | | |
| 46 | 1 | 5 | 0 | 57 | O | O | O |
| 49 | 2 | 6 | 0 | 64 | O | O | O |
| 55 | 1 | 6 | 0 | 60 | O | O | O |
| 59 | 2 | 7 | 0 | 61 | O | O | O |
| 78 | 3 | 6 | 0 | 56 | O | O | O |
| 80 | 2 | 5 | 0 | 58 | O | O | O |
| Comparative Examples | | | | | | | |
| 37 | 5 | 48 | 0 | 48 | O | X | X |
| 39 | 4 | 44 | 0 | 53 | O | O | O |
| 41 | 6 | 45 | 0 | 55 | O | O | O |
| 71 | 6 | 50 | 0 | 50 | O | O | X |
| (89) | 6 | 6 | 58 | 40 | X | X | X |
| (90) | 8 | 7 | 64 | 37 | X | X | X |
| (91) | 7 | 6 | 60 | 38 | O | X | X |
| (92) | 4 | 5 | 49 | 46 | O | O | X |
| (94) | 7 | 6 | 62 | 39 | X | X | X |
| (98) | 9 | 7 | 62 | 39 | X | X | X |

In the present Example, there were obtained the similar results to Example 6. The magnetic heads obtained in the present Example enable recording at higher density with a magnetic recording and reproducing apparatus owing to use of a magnetic film made of an Fe-C based material with extremely high saturation magnetic flux density.

EXAMPLE 8

The magnetic heads of the structure shown in FIG. 3 were produced by using the materials employed in Example 1. The glass charging and bonding temperatures were set in accordance with bonding temperatures of the glasses shown in Tables 3 and 4. The results of the practical use tests on the obtained magnetic heads are shown in Table 13. Evaluation of the magnetic heads was in the same way as in Example 1.

TABLE 13

| Bonding glass No. | Fraction defective (%) Working | Cells | Corrosion | Head chip strength (gf) | Tape sliding test (wear characteristics) 3.75 m/sec | 5.8 m/sec | 11 m/sec |
|---|---|---|---|---|---|---|---|
| Examples | | | | | | | |
| 13 | 4 | 8 | 0 | 50 | O | O | X |
| 14 | 3 | 8 | 0 | 53 | O | O | X |
| 15 | 2 | 6 | 0 | 50 | O | O | O |
| 16 | 3 | 7 | 0 | 49 | O | O | O |
| 17 | 4 | 6 | 0 | 53 | O | O | O |
| 40 | 4 | 5 | 0 | 58 | O | O | O |
| 46 | 2 | 4 | 0 | 55 | O | O | O |
| 72 | 4 | 6 | 0 | 47 | O | O | X |
| 78 | 3 | 7 | 0 | 49 | O | O | O |
| 80 | 2 | 5 | 0 | 52 | O | O | O |
| Comparative Examples | | | | | | | |
| 10 | 8 | 23 | 0 | 47 | O | O | X |
| 21 | 5 | 21 | 0 | 51 | O | O | O |
| 34 | 6 | 26 | 0 | 50 | O | O | X |
| 38 | 4 | 27 | 0 | 53 | O | O | O |
| 71 | 7 | 24 | 0 | 47 | O | O | X |
| 75 | 8 | 30 | 0 | 50 | O | O | X |
| 76 | 4 | 20 | 0 | 50 | O | O | X |

TABLE 13-continued

| Bonding glass No. | Fraction defective (%) Working | Cells | Corrosion | Head chip strength (gf) | Tape sliding test (wear characteristics) 3.75 m/sec | 5.8 m/sec | 11 m/sec |
| --- | --- | --- | --- | --- | --- | --- | --- |
| (89) | 15 | 5 | 64 | 34 | O | X | X |
| (90) | 20 | 5 | 67 | 26 | X | X | X |
| (91) | 15 | 4 | 64 | 28 | O | X | X |
| (94) | 17 | 5 | 65 | 30 | X | X | X |
| (98) | 12 | 3 | 62 | 28 | O | X | X |

In the present Example, there were obtained the similar results to Example 1. The magnetic head of FIG. 3 is not of the type in which the bonding glass and the non-magnetic gap material are reacted for bonding as in the magnetic heads of FIGS. 1 and 2 but of the type in which bonding is effected upon casting of the bonding glass. Thus, there is no need of reacting the bonding glass with the non-magnetic gap material. Rather, if they are reacted exceedingly, there may take place excess corrosion of the magnetic film. In the comparative examples using $PbO-B_2O_3$ based glasses of Nos. (89)-(91), (94) and (98), the magnetic film is apt to be corroded excessively since these glasses react well with $SiO_2$ glass used as non-magnetic gap material. Therefore, the magnetic heads of the comparative examples are very high in fraction defective relating to corrosion of magnetic film. The bonding glasses having vanadium as main component element used in the examples of this invention and in some of comparative examples scarcely react with $SiO_2$. Even if they should be reacted, such reaction is so limited that it hardly causes corrosion of the magnetic film. Owing to this, no defective due to corrosion of magnetic film was found in the magnetic heads made by using these bonding glasses. Also, use of these glasses for the magnetic heads of the type shown in FIG. 3 leads to a reduction of fraction defective relating to working and fraction defective relating to cells and an improvement of head chip strength.

As appreciated from the foregoing descriptions of the Examples, the magnetic heads according to the present invention notably excel the conventional magnetic heads in mass productivity, wear resistance, scratch resistance, weather resistance and magnetic properties, so that they contribute greatly to realization of higher performance of the magnetic recording and reproducing apparatus such as VTR.

Figure 22:
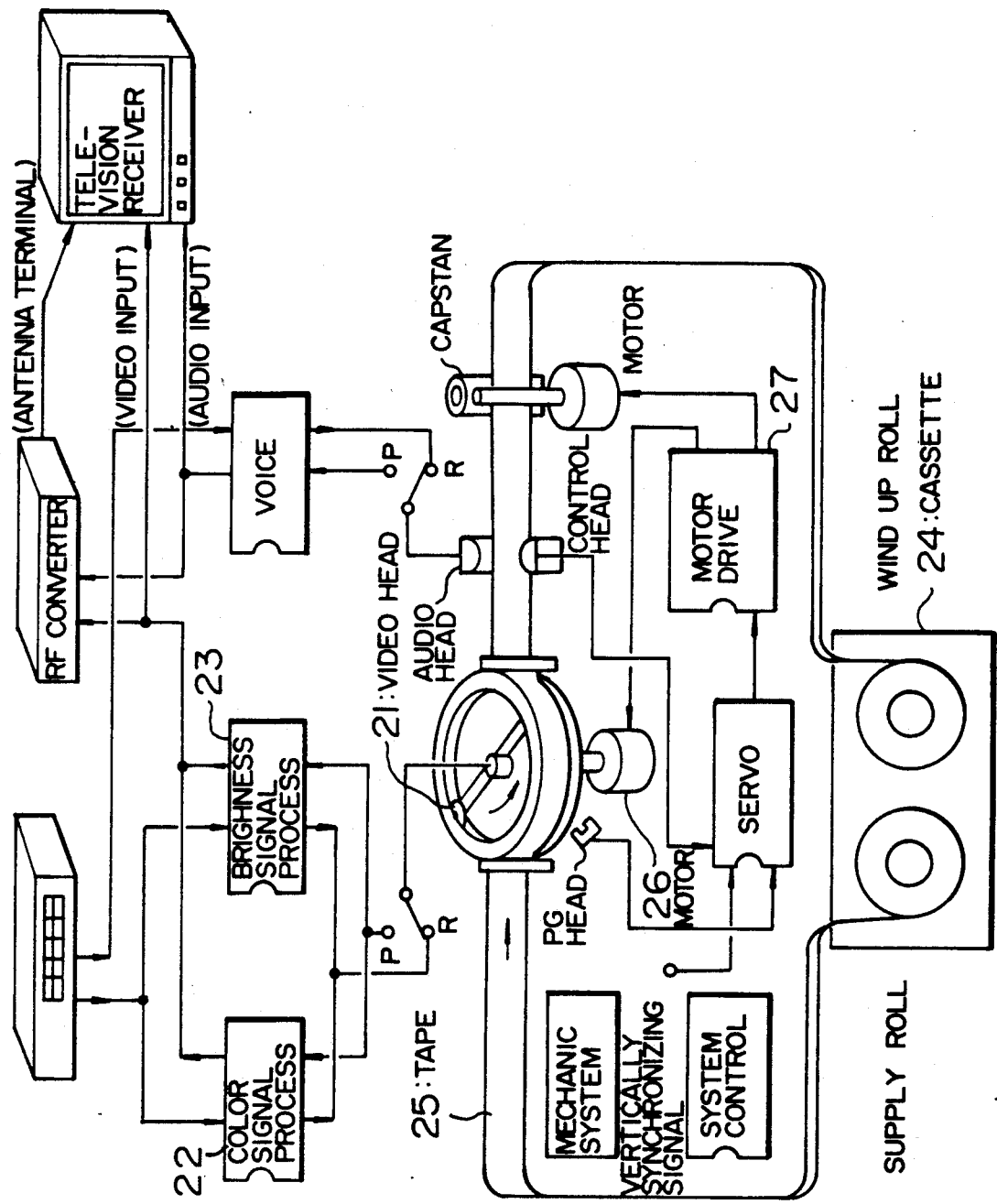
FIG. 22 is a schematic block diagram of a VTR. Reference numerals used in the drawings designate the following elements, parts or materials.

FIG. 22 is a schematic block diagram of a VTR in which said magnetic head is applied. A video head 21, which is a magnetic head, is connected to a control unit consisting of a color signal processor 22 and a luminance signal processor 23 by which the collected information is processed. It is designed to be capable of reading, reproducing and recording information from or on a recording tape 25 delivered out from a cassette 24. Said video head 21 is also connected to a drive unit including a motor 26 and a motor drive 27.

According to the present invention, there is provided a magnetic head having excellent mass productivity, wear resistance, scuff resistance, weather resistance and magnetic properties.

The magnetic head of this invention having said advantages is capable of markedly improving performance and reliability of the magnetic recording and reproducing apparatus such as VTR. It is also applicable to the magnetic recording and reproducing apparatus using a magnetic disc.

What is claimed is:

1. A magnetic head of a structure in which a pair of magnetic cores, each comprising a magnetic film formed on a support, are butted and bonded to each other with glass with the interposition of a non-magnetic gap material, wherein said bonding glass is an oxide type glass containing vanadium as main component element, and 55% or more of vanadium contained in said glass is occupied by tetravalent vanadium.

2. A magnetic head according to claim 1, wherein said bonding glass contains phosphorus and antimony.

3. A magnetic head according to claim 2, wherein said bonding glass contains at least one of lead, tellurium, barium, thalium and arsenic.

4. A magnetic head according to claim 1, wherein said non-magnetic gap material is a composite oxide or oxide mixture containing at least element vanadium.

5. A magnetic head according to claim 4, wherein said non-magnetic gap material contains at least element phosphorus.

6. A magnetic head according to claim 5, wherein said non-magnetic gap material contains at least one of antimony, lead, tellurium, barium, thalium and arsenic.

7. A bonding glass for magnetic head characterized in that said bonding glass is an oxide type glass containing vanadium as main component element, and 55% or more of vanadium contained in said glass is tetravalent vanadium.

8. A bonding glass for magnetic head according to claim 7 characterized in that said bonding glass contains vanadium, oxygen and at least phosphorus and antimony, the contents of said elements calculated as $V_2O_5$, $P_2O_5$ and $Sb_2O_3$ being as follows: $P_2O_5 = 35-75$ parts by weight and $Sb_2O_3 = 40-80$ parts by weight to 100 parts by weight of $V_2O_5$.

9. A bonding glass for magnetic head according to claim 8 characterized in that said bonding glass contains at least one of lead, tellurium and barium, the content of said elements calculated as PbO, $TeO_2$ and BaO being 8-38 parts by weight in all to 100 parts by weight of $V_2O_5$.

10. A bonding glass for magnetic head according to claim 8 characterized in that said bonding glass contains at least one of thalium and arsenic, the content of said elements calculated as $Tl_2O$ and $As_2O_3$ being 3-16 parts by weight in all.

11. A magnetic recording and reproducing apparatus comprising a magnetic head consisting of a pair of magnetic cores comprising a magnetic film of high saturation magnetic flux density and integrally bonded together with the interposition of a non-magnetic gap material with an oxide type glass containing vanadium as main component element, with 55% or more of vanadium contained being occupied by tetravalent vanadium; a magnetic head drive; and a control unit which performs processing of information from or to an information recording medium in association with the magnetic head.

12. A magnetic recording and reproducing apparatus according to claim 11, wherein said magnetic head and the information recording medium or its protective material slide against each other at a relative velocity of 5.8 m/sec or above.

* * * * *